FIG. 5

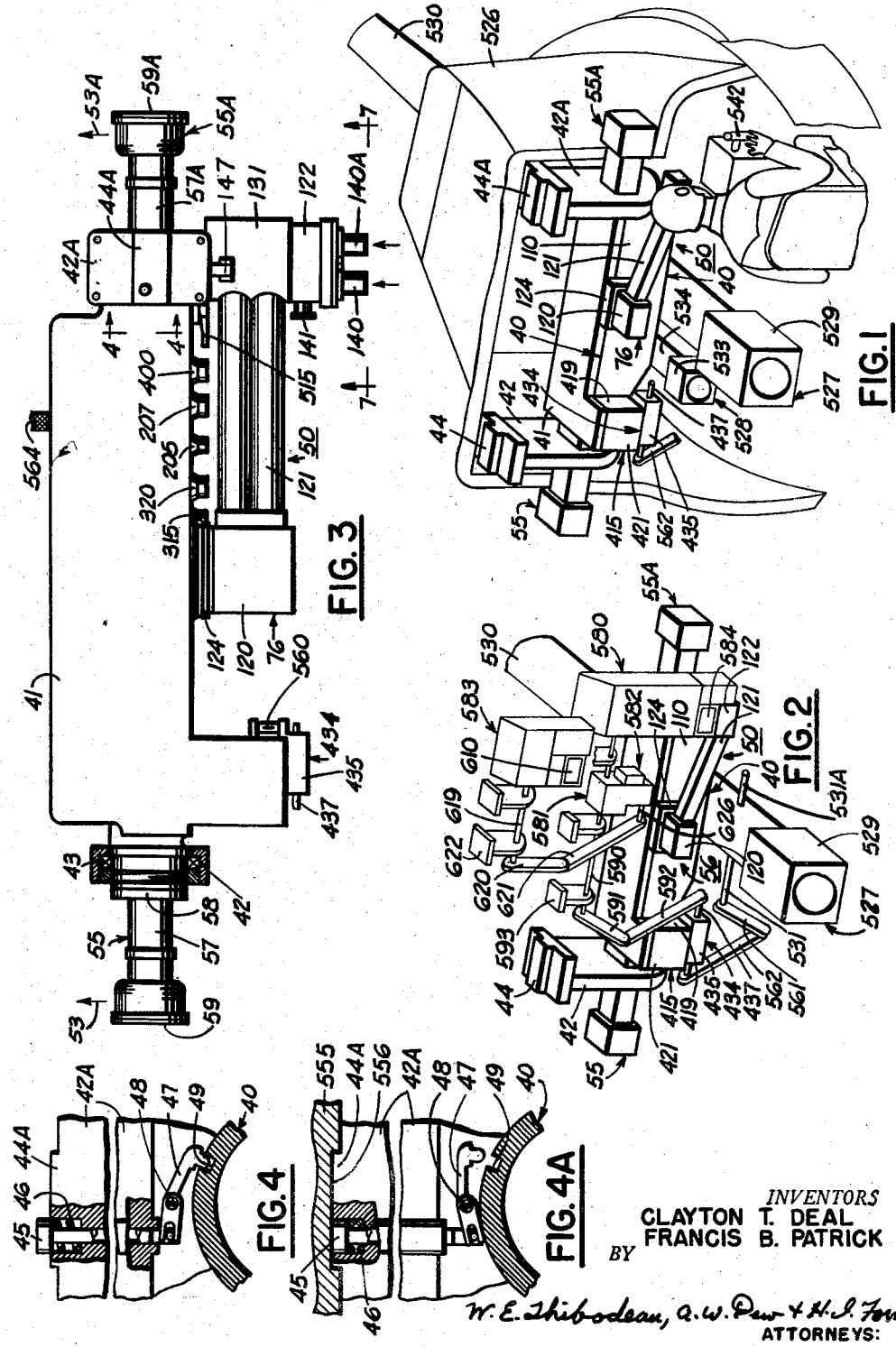
Oct. 28, 1958 — C. T. DEAL ET AL — 2,857,816
AUTO-COLLIMATED STEREOSCOPIC RANGE FINDER INCORPORATING A BALLISTIC COMPUTING MECHANISM
Filed July 23, 1956 — 11 Sheets-Sheet 1
INVENTORS
CLAYTON T. DEAL
FRANCIS B. PATRICK
BY
ATTORNEYS:

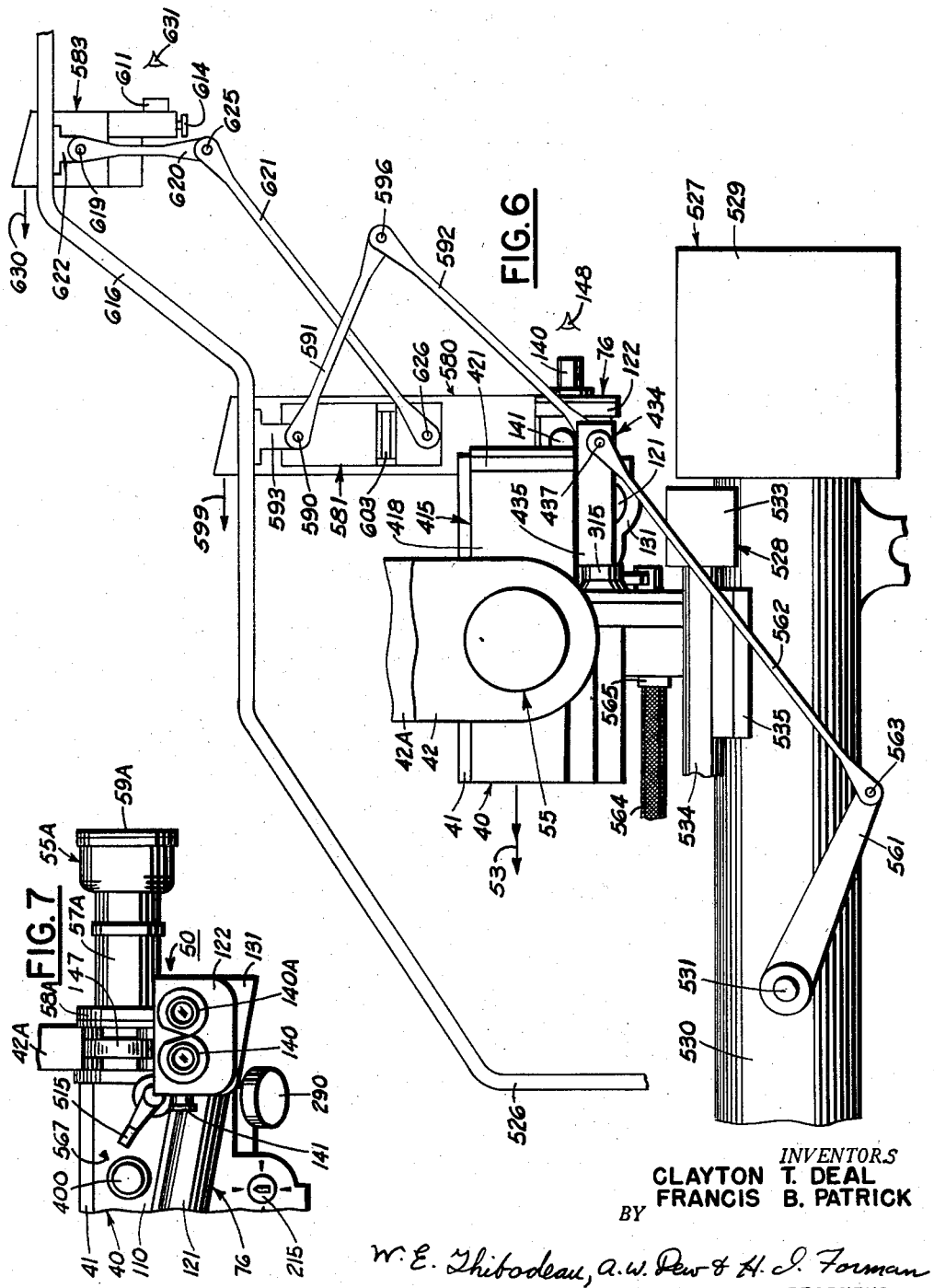

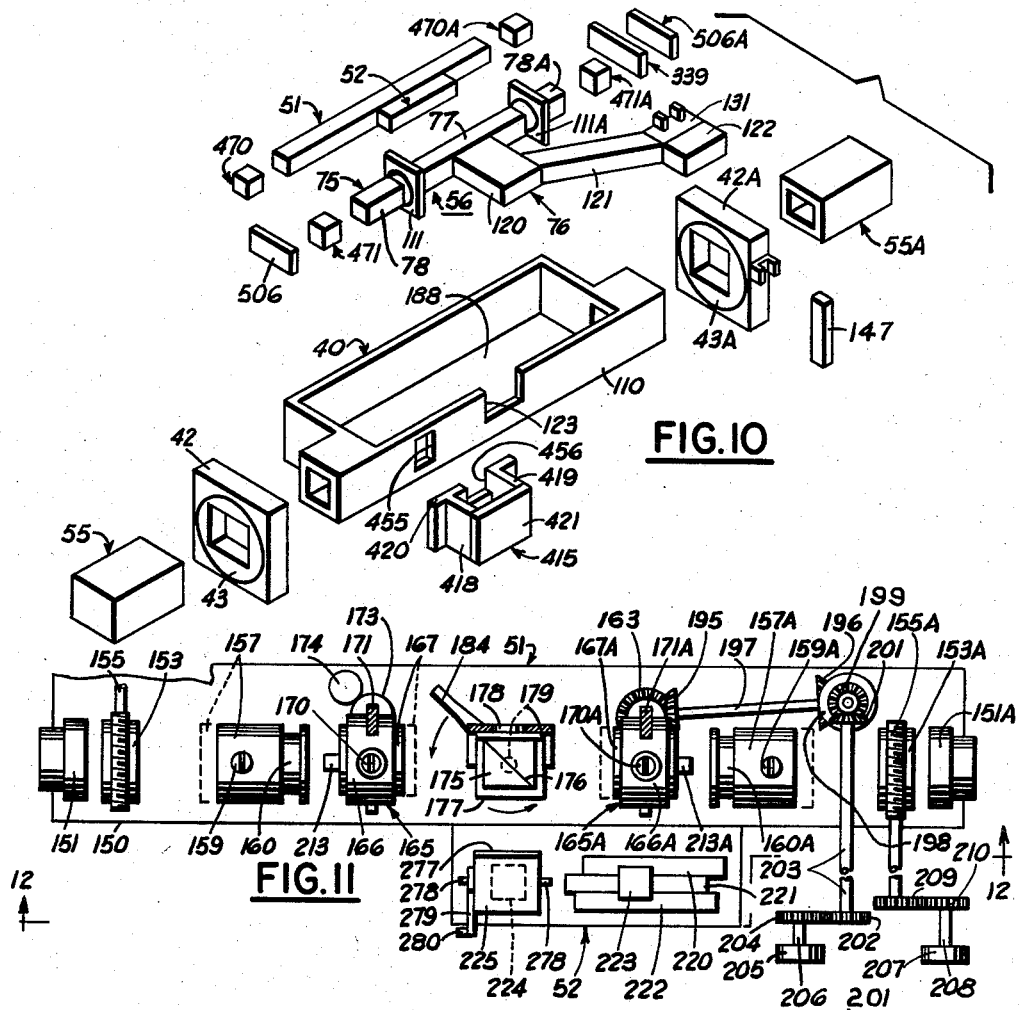

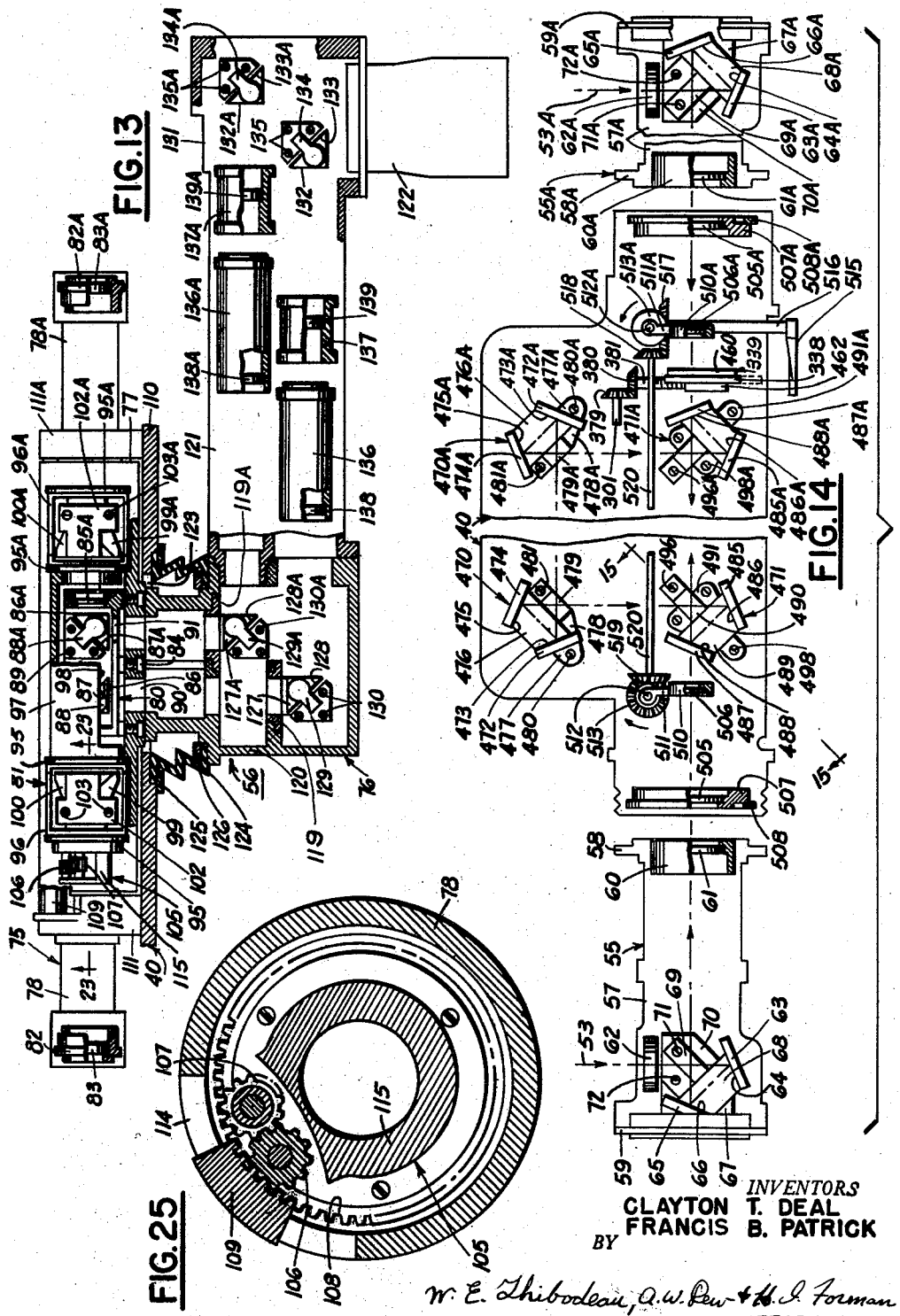

Oct. 28, 1958    C. T. DEAL ET AL    2,857,816
AUTO-COLLIMATED STEREOSCOPIC RANGE FINDER INCORPORATING
A BALLISTIC COMPUTING MECHANISM
Filed July 23, 1956    11 Sheets-Sheet 7

INVENTORS
CLAYTON T. DEAL
FRANCIS B. PATRICK
BY
W. E. Thibodeau, A. W. Pew & H. I. Forman
ATTORNEYS Oct. 28, 1958 C. T. DEAL ET AL 2,857,816
AUTO-COLLIMATED STEREOSCOPIC RANGE FINDER INCORPORATING
A BALLISTIC COMPUTING MECHANISM
Filed July 23, 1956 11 Sheets-Sheet 8
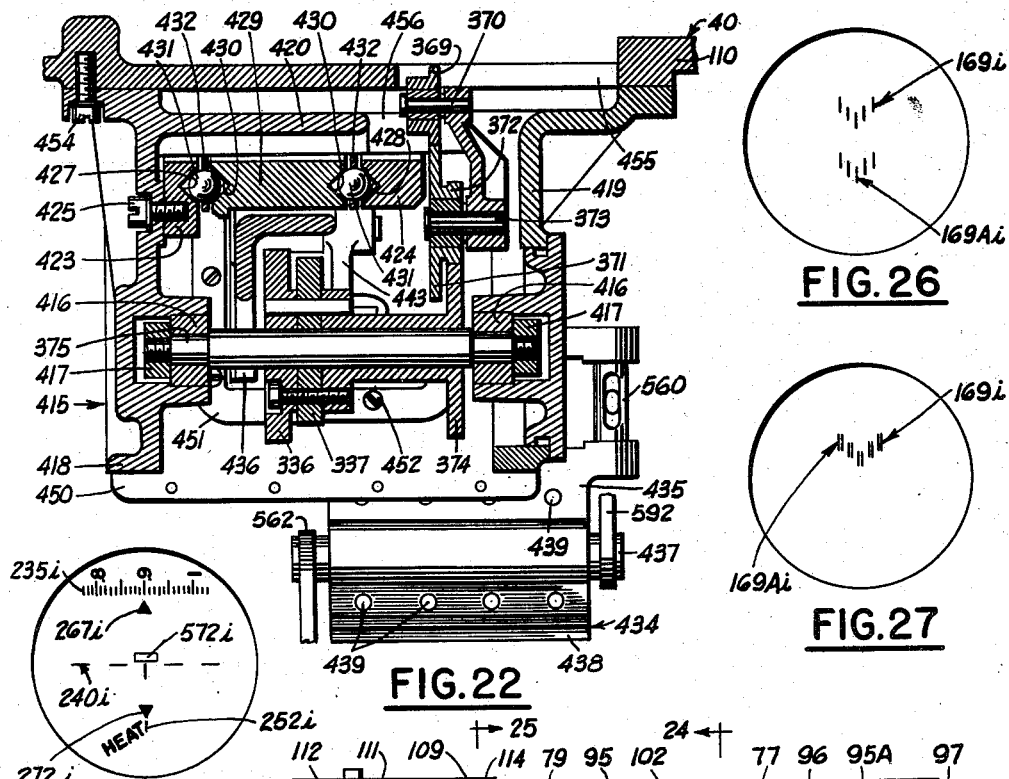
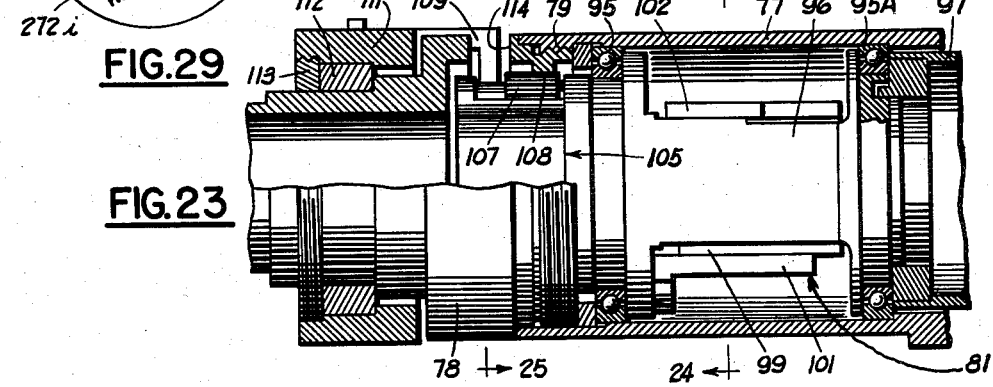
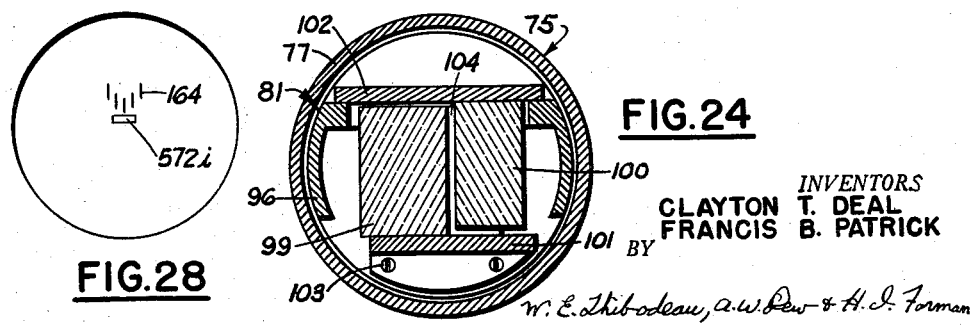
INVENTORS
CLAYTON T. DEAL
FRANCIS B. PATRICK
ATTORNEYS

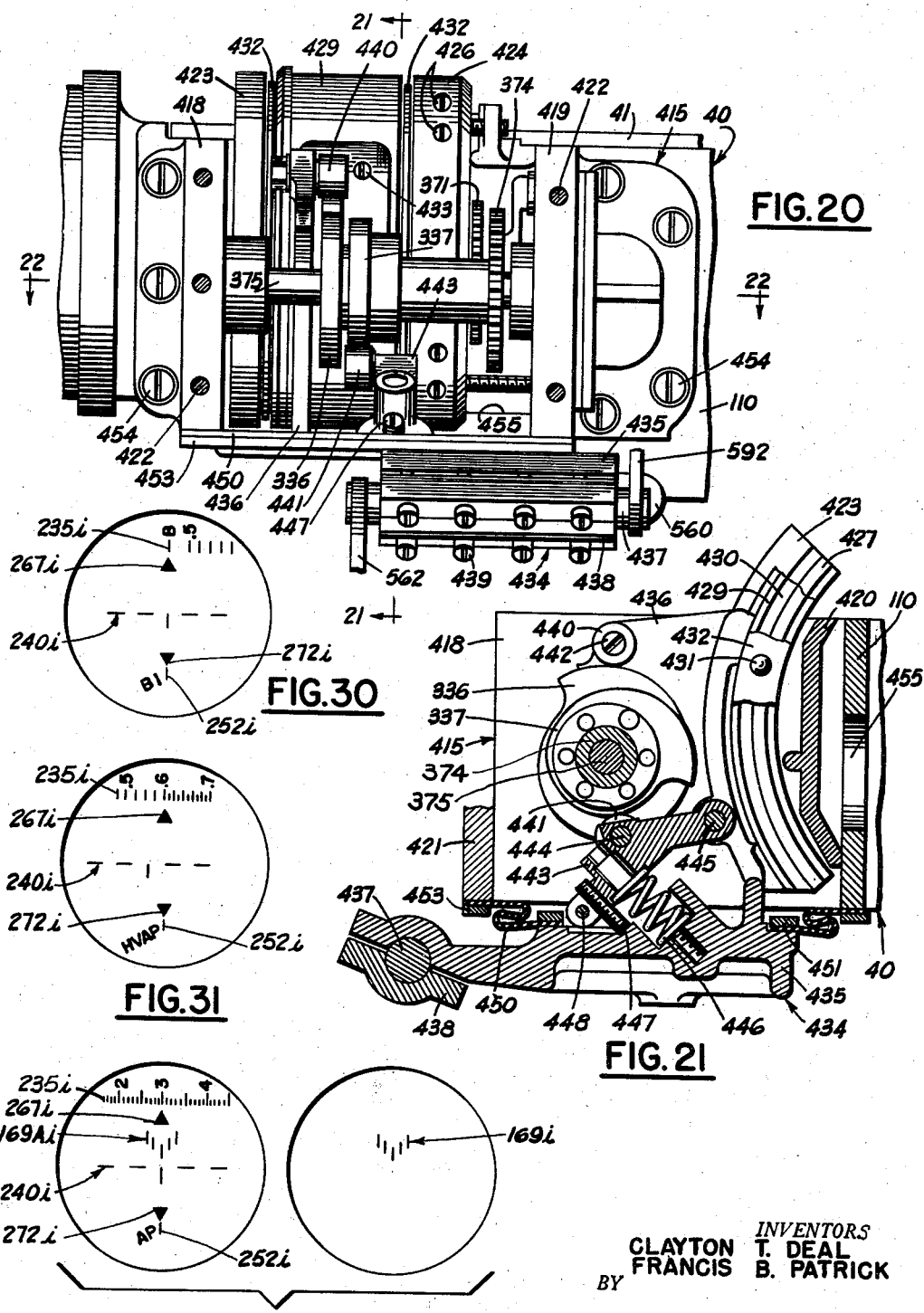

Oct. 28, 1958

C. T. DEAL ET AL 2,857,816

AUTO-COLLIMATED STEREOSCOPIC RANGE FINDER INCORPORATING
A BALLISTIC COMPUTING MECHANISM

Filed July 23, 1956

INVENTORS
CLAYTON T. DEAL
FRANCIS B. PATRICK
BY

ATTORNEYS

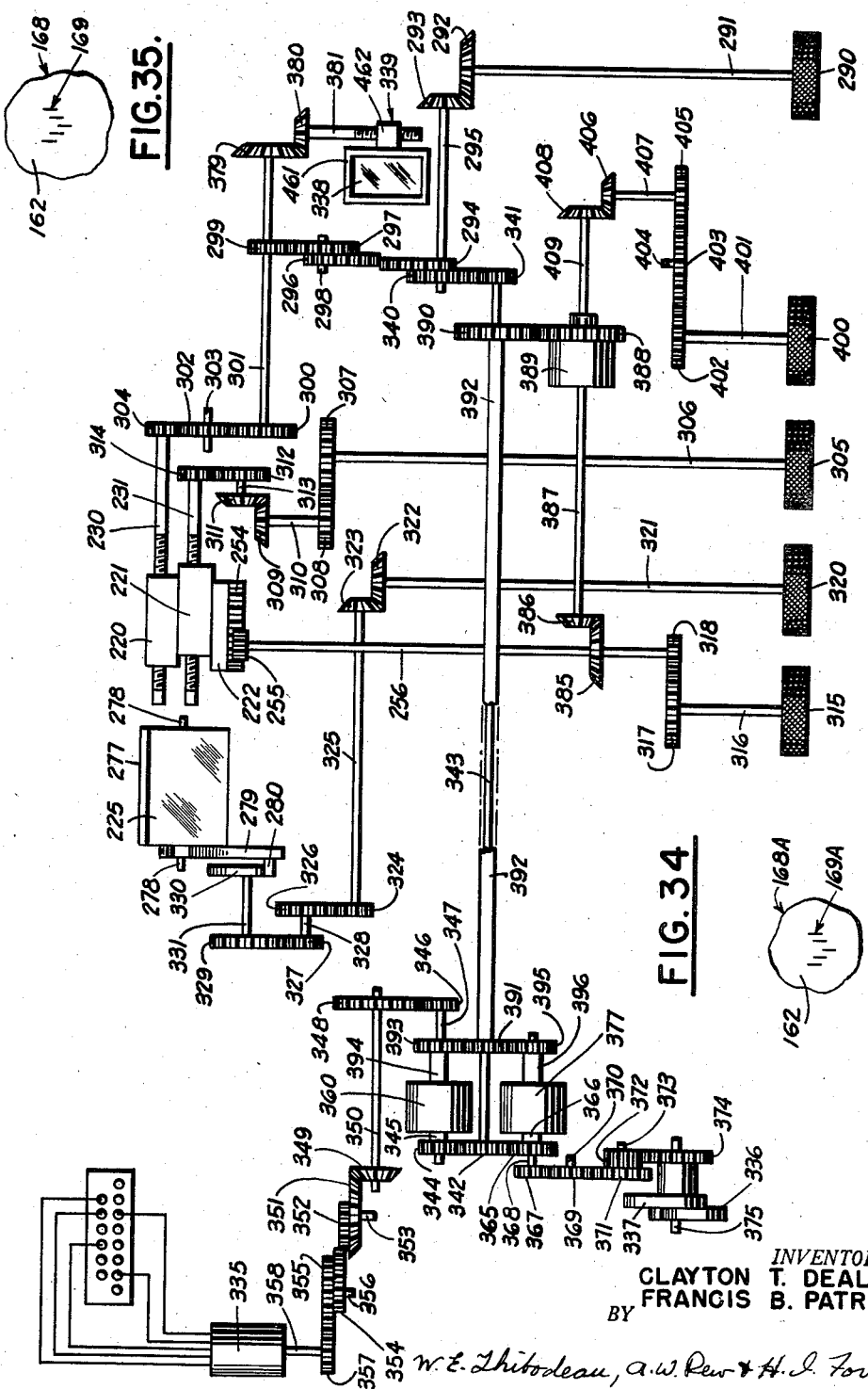

United States Patent Office
2,857,816
Patented Oct. 28, 1958

2,857,816

AUTO-COLLIMATED STEREOSCOPIC RANGE FINDER INCORPORATING A BALLISTIC COMPUTING MECHANISM

Clayton T. Deal, Abington, and Francis B. Patrick, Philadelphia, Pa., assignors to the United States of America as represented by the Secretary of the Army Application July 23, 1956, Serial No. 599,666

15 Claims. (Cl. 89—41)

(Granted under Title 35, U. S. Code (1952), sec. 266)

The invention described herein may be manufactured and used by or for the Government for governmental purposes without the payment of any royalty thereon.

The present invention relates to fire control systems and fire control apparatus and more particularly to those systems and instruments useful in directing the fire of weapons carried by armored vehicles, gun turrets, or the like.

Heretofore, fire control systems for armored vehicles, or the like, have been limited due to the relatively small space available compared with that required to accommodate apparatus for accurately determining and introducing corrections for ambient ballistic factors necessary to properly elevate the armament preparatory to firing at a target. The systems relied, to a great extent, upon estimated factors which were introduced separately, each one requiring an independent operation at a sacrifice of accuracy and time. This, of course, is an obstacle to the accomplishment of the mission.

Therefore, it is a primary purpose of the present invention to provide an improved system for fire control and to provide apparatus which will overcome the difficulties of prior art systems and produce a more accurate, reliable and effective means of controlling the fire of armament of the kind particularly employed on vehicles, in turrets of in other similar applications presenting limited space requirements.

It is also an object of the present invention to provide apparatus which will automatically compensate for ambient ballistic factors essential to accurately fire weapons associated therewith.

A further object of the present invention is to provide apparatus which will accurately and automatically introduce corrections for superelevation based upon conditions encountered in the field of action.

Another object of the present invention is to provide apparatus which will enable accurate measurements of range to be made by an observer while, at the same time, he is kept informed of the ballistic factors introduced for effecting accuracy of fire.

An additional object of the present invention is to provide an improved system for fire control for armored vehicles, or the like, which will enable corrections for superelevation to be introduced even though portions of the apparatus have been damaged.

Furthermore, it is an object of the present invention to provide both a primary and a secondary system for controlling the fire of armament from a vehicle whereby the effectiveness of fire and usefulness of the apparatus is enhanced.

It is also an object of the present invention to provide apparatus for controlling the fire of armament which will obviate the need for memorizing and estimating certain ballistic factors necessary to introduce corrections for superelevation.

In accordance with the present invention, there is provided a primary and a secondary system for controlling the fire of weapons employed in an armored vehicle or the like. The primary system comprehends the use of an apparatus which is essentially a range finder adapted to introduce corrections not only for range but also for type of ammunition selected for fire at a target and for ambient ballistic conditions such as muzzle velocity, air density, air temperature, wind, etc. The instrument is arranged so that discrete images representative of the ballistic factors introduced can be projected and superimposed upon the field of view of the observer whereby he may be constantly apprised of such conditions without removing his eyes from the instrument. This enables the observer to keep the target in view at all times. The instrument is also provided with electro-mechanical means whereby the superelevation corrections are automatically converted and transmitted to the mechanism for elevating or depressing the armament in accordance with the superelevation factors introduced. The secondary system comprises a commander periscope and a gunner periscope both of which are observation instruments intended primarily for use in the event the instrument of the primary system fails to operate. Both periscopes are mechanically coupled with the fire control instrument of the primary system and the armament so that they function in parallelism. Superelevation corrections can be introduced through the secondary system by a ballistic drive unit operatively connected with the periscopes. This unit functions to elevate or depress the periscopes relative to the armament, the armament, in turn, being corrected for superelevation by power driven or manual controls operated to bring the periscopes back on target. Since both power driven and manual controls for elevating or depressing the armament are provided, automatic correction for superelevation by means of the fire control instrument of the primary system may be supplemented thereby. In addition, other features include provision for maintaining the fire control instrument eyepieces stationary relative to the objective optical elements and provision for correcting image lean as a consequence of movement of the objective optical elements relative to the eyepiece elements.

The foregoing and other objects of the present invention will become apparent from the following description and the accompanying drawings which explain and illustrate one preferred embodiment thereof. It is to be understood that the preferred embodiment is chosen for illustrative purposes only, and that other embodiments may be provided without departing from the spirit and scope of the present invention. In the drawings:

Fig. 1 is a perspective view showing fire control apparatus of the present invention installed in the turret of an armored vehicle, or the like, the turret being shown partly broken away; showing a portion of the main armament and part of one of the controls for effecting movement of the turret, the main armament, and the instrument; and showing the upper portion of an observer in position for using the instrument; the instrument and the main armament are drawn in simplified, block form and in prominent lines; and the turret, the control and the upper portion of the person are also drawn in simplified form, but in comparatively thin lines;

Fig. 2 is a perspective view showing the fire control instrument of the present invention mechanically coupled to the main armament and operatively connected with other fire control apparatus; the instrument and the main armament are drawn in simplified, block form and in prominent lines; and the prior art fire control apparatus is also drawn in simplified form, but in comparatively thin lines;

Fig. 3 is a plan view of the fire control instrument of the present invention, partly broken away and partly sectioned to show certain structural details;

Fig. 4 is an enlarged view, partly broken away and partly sectioned, taken along line 4—4 of Fig. 3, to show details of a latch associated with one of the pillow blocks, the latch being shown in the locked position;

Fig. 4A is similar to Fig. 4 except that the latch is shown in the unlocked position;

Figure 5:
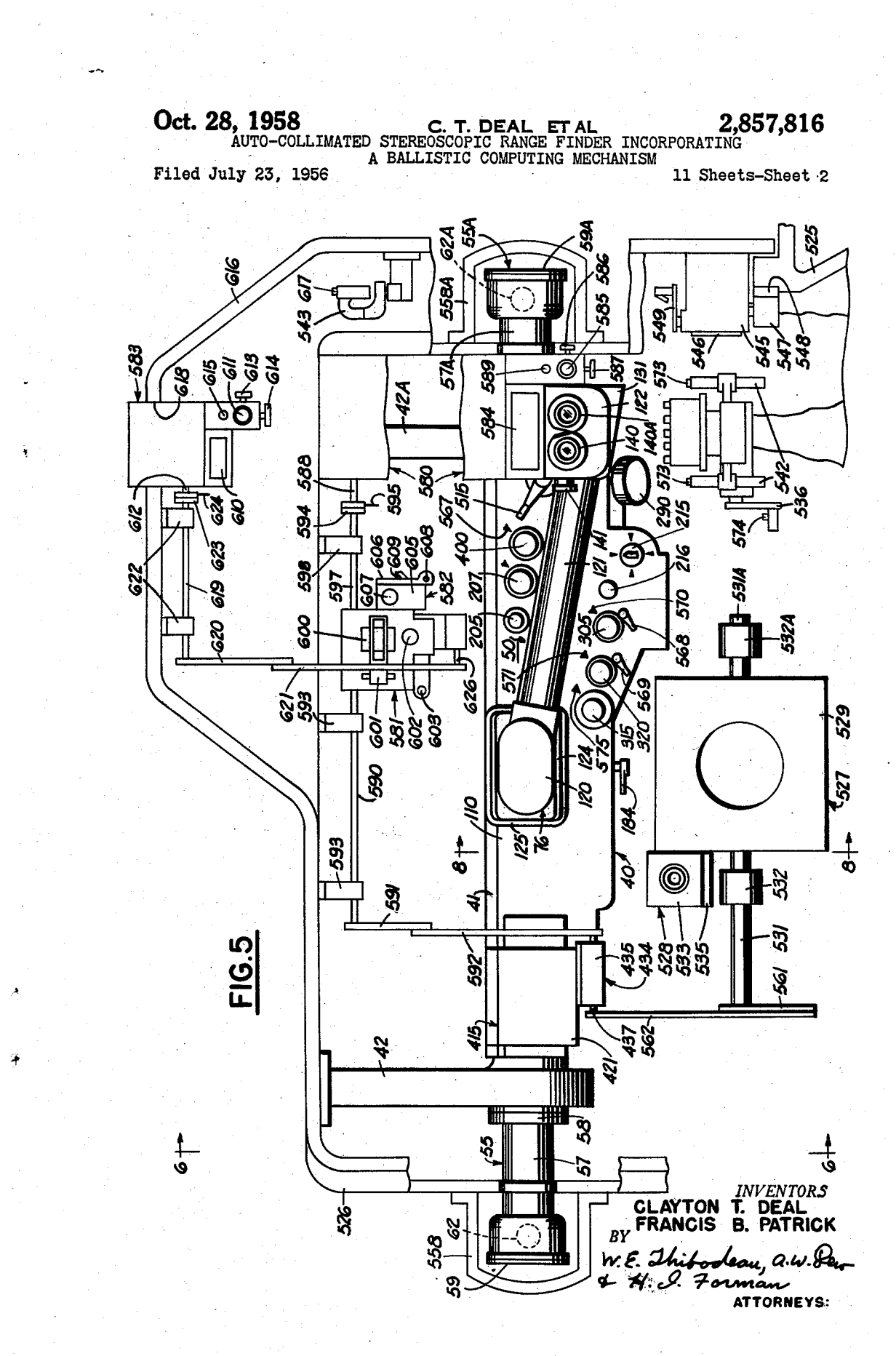
Figure 8:
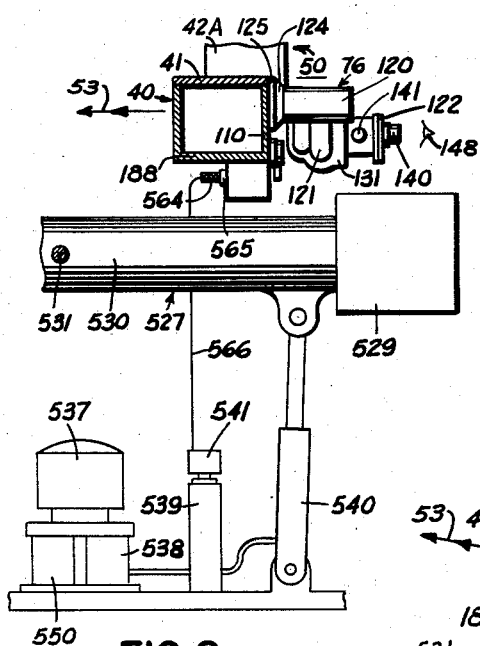
Figure 8A:
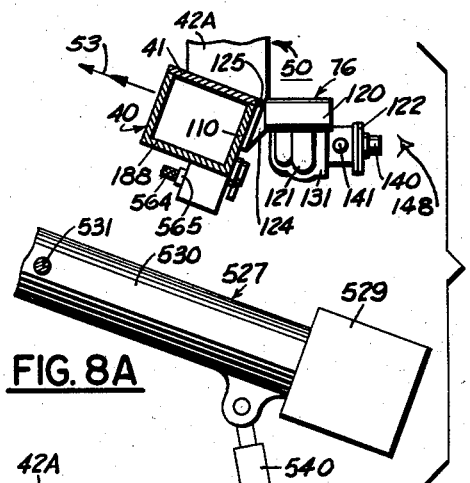
Figure 8B:
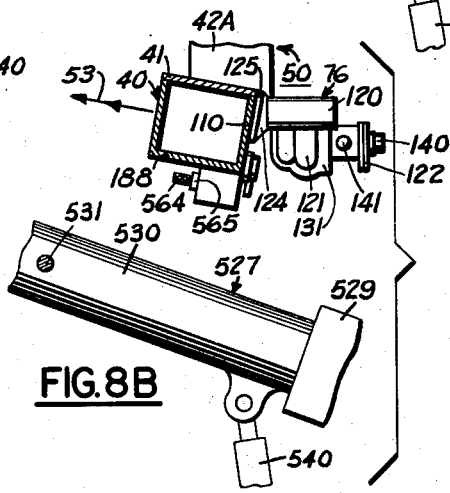
Figure 9:
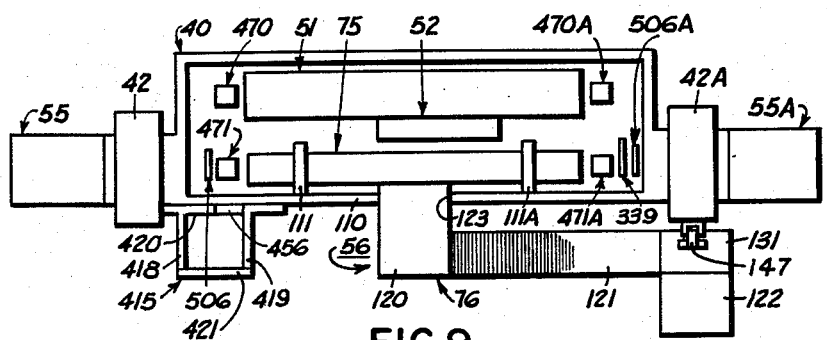
Figure 19:
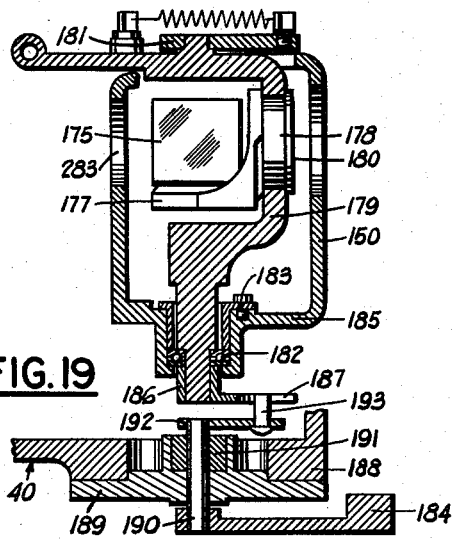
Figure 18:
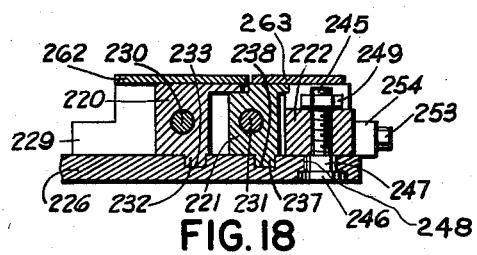
Figure 17:
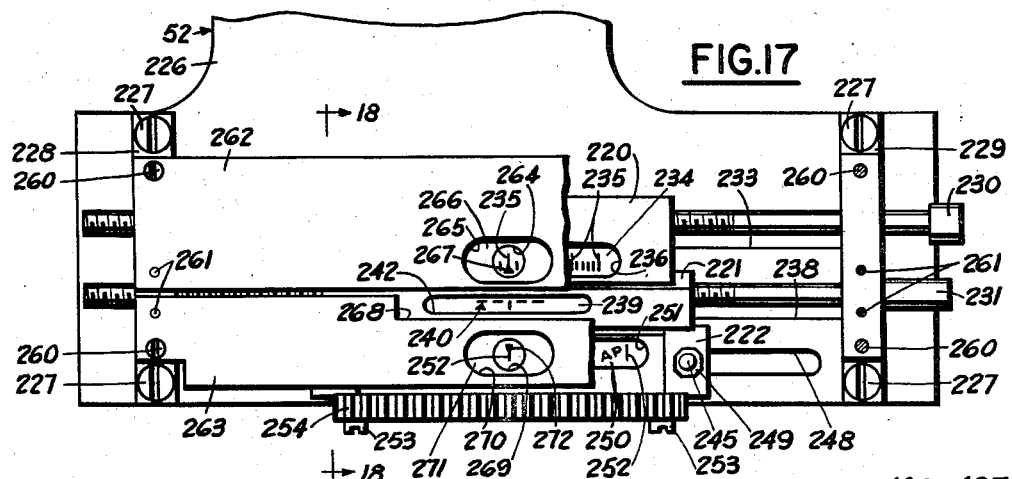
Figures 15, 16:
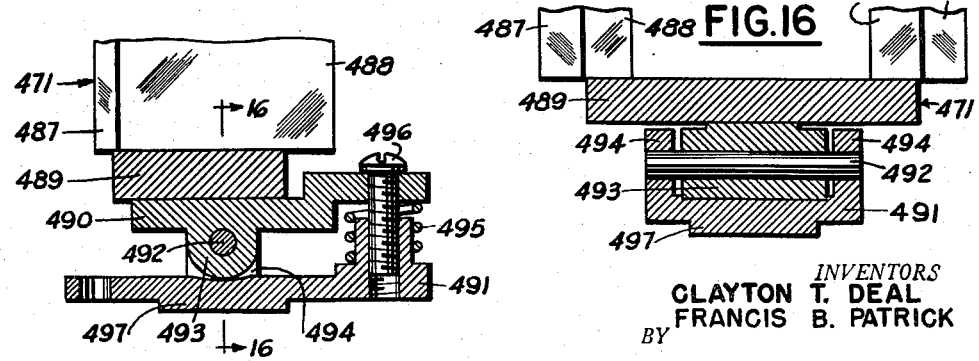
Figure 33:
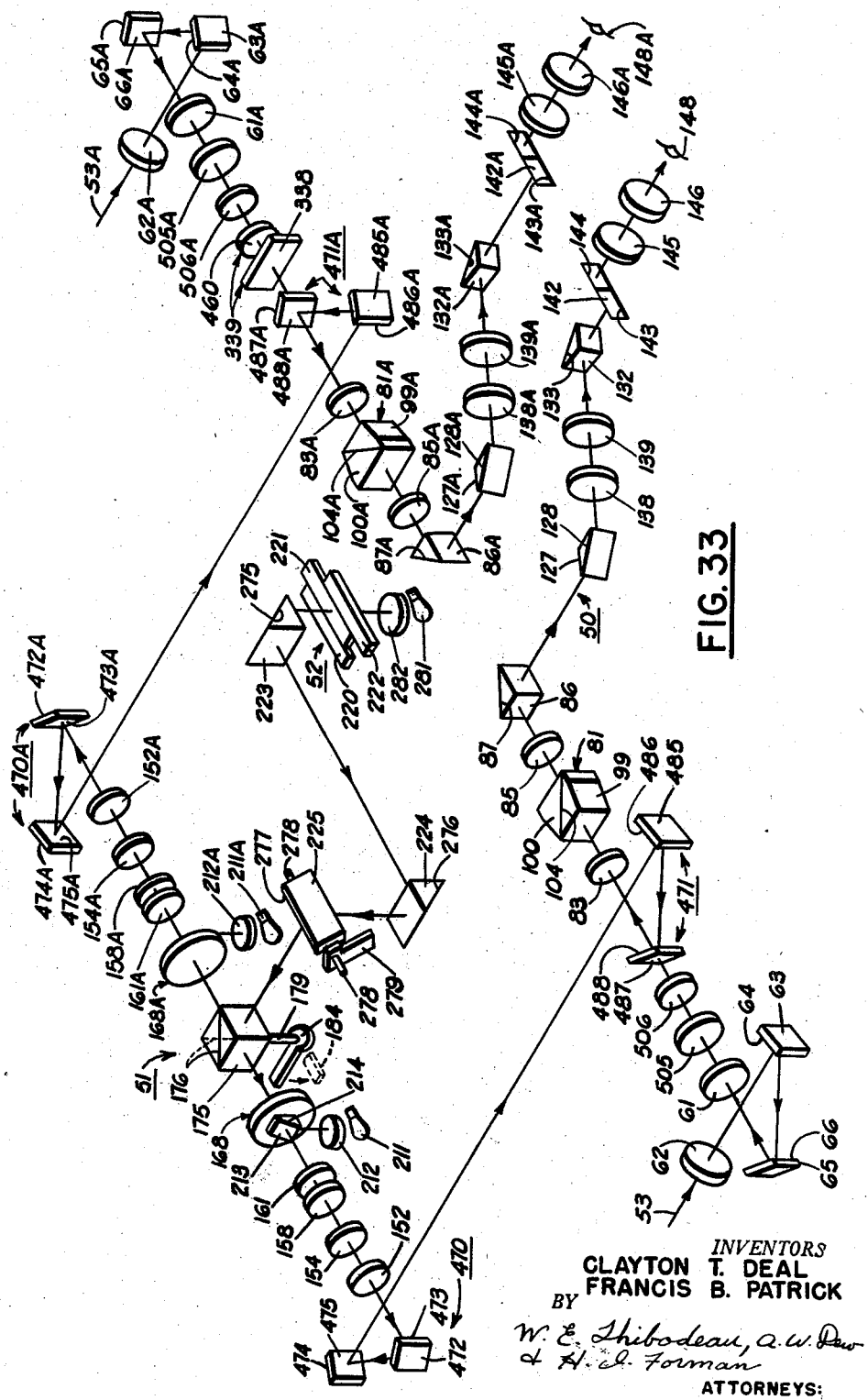

Fig. 5 is a view of the fire control instrument installed in the turret of an armored vehicle and mechanically coupled to the main armament and to other fire control apparatus, as seen from the breach end of the armament; the instrument, the armament and the mechanical coupling therebetween are drawn in prominent line; and the remainder of the apparatus being drawn in simplified form and in comparatively thin lines;

Fig. 6 is a side view of the apparatus shown in Fig. 5, taken along the line 6—6 thereof; the instrument, the main armament and the mechanical coupling therebetween are drawn in simplified form and in prominent lines; and the remainder of the apparatus is also drawn in simplified form, but in comparatively thin lines;

Fig. 7 is a view of the right end of the instrument, taken along the line 7—7 of Fig. 3, certain parts having been removed to show structure otherwise obscured by those parts;

Fig. 8 is a cross section, taken along line 8—8 of Fig. 5, drawn on a reduced scale and extended to include a portion of the turret floor and certain other equipment ancillary to the instrument and to the armament; the instrument and the main gun are drawn in simplified form and in prominent lines; and the turret floor and the vehicle equipment are also drawn in simplified form but in comparatively thin lines;

Fig. 8A is similar to the gun and instrument portion of Fig. 8 and shows the relative position of parts as the angle of elevation of the gun and instrument is changed prior to introducing superelevation correction;

Fig. 8B is similar to Fig. 8A, showing the relation of parts after introducing superelevation correction;

Fig. 9 is a plan view of the fire control instrument shown in simplified, block form with the cover plate of the instrument main housing removed so as to expose certain components, also shown in block form, positioned in that housing;

Fig. 10 is an exploded, perspective view of Fig. 9, showing the components in simplified, block form;

Fig. 11 is a plan view showing certain components of the collimator and the scales-gun reticle unit drawn in simplified, block form and in prominent lines; for convenience, the respective units are enclosed by comparatively thin lines so as to be more readily distinguishable from each other;

Fig. 12 is a side view, taken along line 12—12 of Fig. 11, showing more details relating to the collimator and to the scales-gun reticle unit; many of the components shown are partly broken away and partly sectioned to expose certain optical elements contained in the respective components;

Fig. 13 is a plan view of a portion of the binocular, partly broken away and partly sectioned, showing certain components in simplified form;

Fig. 14 is a plan view showing certain components in the instrument main housing and other components in the instrument left and right end housings; for convenience, the boundaries of the respective housings are drawn in comparatively thin lines and the end housings are shown separated from the main housing;

Fig. 15 is a cross section, drawn to an enlarged scale, taken along line 15—15 of Fig. 14, showing structural details relating to the adjustability of one of the reflectors;

Fig. 16 is a cross section, taken along line 16—16 of Fig. 15, showing other details relating to the components in Fig. 15;

Fig. 17 is a plan view of the scales-gun reticle unit;

Fig. 18 is a cross section, taken along line 18—18 of Fig. 17, showing additional details of the scale-gun reticle unit;

Fig. 19 is a central, vertical cross section through the transfer prism;

Fig. 20 is an enlarged view of a left hand portion of the instrument showing the cam housing with certain parts removed to expose some components contained in that housing;

Fig. 21 is a cross section, taken along line 21—21 of Fig. 20, showing additional details relating to the cam housing and to certain components therein;

Fig. 22 is a cross section, taken along line 22—22 of Fig. 20, showing further details relating to the cam housing and to certain components therein;

Fig. 23 is a cross section, taken along line 23—23 of Fig. 13, but drawn to an enlarged scale and showing more details relating to the binocular;

Fig. 24 is a full cross section, taken along line 24—24 of Fig. 23, showing further details relating to the binocular;

Fig. 25 is a full cross section, taken along line 25—25 of Fig. 23, showing further details relating to the binocular;

Fig. 26 is a representation to illustrate the image of the right stereoscopic reticle pattern displaced vertically relative to the image of the left stereoscopic reticle pattern as seen in the field of view;

Fig. 27 is similar to Fig. 26, but shows the image of the left stereoscopic reticle pattern displaced laterally relative to the image of the right stereoscopic reticle pattern;

Fig. 28 is similar to Figs. 26 and 27, but shows the images of the left and the right stereoscopic reticle patterns in substantial coincidence with each other and in stereoscopic contact with the image of a selected target;

Fig. 29 represents the image of an arbitrarily selected portion of the laterally movable range scale, the image of the fixed reference mark disposed adjacent to the range scale, the image of the laterally movable gun reticle, the image of an arbitrarily selected portion of the laterally movable ammunition scale, the image of the fixed reference mark disposed adjacent to the ammunition scale, and the image of a selected target as seen in the field of view;

Fig. 30 is similar to Fig. 29, but the image of a different portion of the range scale and the image of a different portion of the ammunition scale are shown, the image of the selected target being omitted;

Fig. 31 is similar to Fig. 30, but the image of still another portion of the range scale and still another portion of the ammunition scale are shown; in addition, the image of the gun reticle is arbitrarily displaced laterally from the position shown in the latter figure;

Fig. 32 represents the images seen respectively in the left and right eyepieces of the binocular, that in the left eyepiece showing another arbitrarily selected portion of the laterally movable range scale, both of the fixed reference marks, the gun reticle, another arbitrarily selected portion of the ammunition scale and the images of the left and right stereoscopic reticle patterns;

Fig. 33 is a perspective view showing the optical elements of the fire control instrument in simplified form and arranged to show, schematically, the optical systems used in the instrument;

Fig. 34 is a schematic drawing of a mechanical arrangement used in the instrument;

Fig. 35 represents a portion of the left stereoscopic reticle assembly and shows the left stereoscopic reticle pattern;

Fig. 36 is similar to Fig. 35, but shows the stereoscopic reticle pattern of the right stereoscopic reticle assembly.

Referring, now, more particularly to the drawings, wherein similar reference characters designate corresponding parts throughout, there is shown a preferred embodiment of fire control instrument, in accordance with the present invention, as employed with armament of the type used in an armored vehicle.

The fire control instrument is essentially an auto-collimated, stereoscopic range finder which incorporates a ballistic computing mechanism. The instrument comprises a number of subassemblies, some entirely mechanical or electrical, some part mechanical and part optical, and all contained within a main housing or subhousings attached thereto. Generally, these subassemblies comprise an optical system, a scales-gun reticle system and associated optical couplings, mechanical linkages and electrical components.

As the description proceeds, reference will be made to the left and right portions of an element, unit or assembly as well as to the top or bottom thereof. Such designation refers to the parts as they appear in the figures of the drawings. In addition thereto, some of the units or assemblies employ duplicate parts disposed in systems or arranged separately in the left and right portions of that unit or assembly. Such duplicate parts will be identified with the same reference numeral except that those parts disposed in the right portion will be identified with the letter "A" following the numeral. In the case of duplicate parts or systems, the description will be confined to only one of the parts. Therefore, it will be assumed that, with respect to the other duplicate part, the description will apply except in an opposite sense.

*Main housing, pillow blocks and latching mechanism*

The main housing 40 (Figs. 1, 2, 5, 6, 8 through 10 and 14), which is the largest structural component of the instrument and which contains, or has attached to it, many of the components of our invention, is a rectangular, box-like member which is open at its left and right ends as well as at its top.

Attached in convenient manner, as by screws (not shown), atop main housing 40 is a cover plate 41 (Figs. 1, 3 and 5 through 8B) which serves to close the otherwise open top of the main housing.

Positioned on main housing 40, near each end thereof, is a pillow block 42 which serves to support the instrument in an armored vehicle or other emplacement. Each pillow block is provided with an antifriction bearing 43 (Figs. 3 and 10) which is positioned between the pillow block and the main housing. A tongue 44 (Figs. 1 through 4A) is provided on the upper surface and extends in a direction substantially parallel to the axis of the antifriction bearing. The tongue facilitates installation of the instrument when it is secured to a mounting plate of a support so that the main housing is supported for limited rotative movement by the pillow blocks.

Until the instrument is installed for use, left pillow block 42 is freely rotatable relative to main housing 40, but right pillow block 42A is locked against rotation relative to the main housing. This is done to enable the right pillow block to serve as a rigid support thereby to preserve proper orientation of parts until all parts of the instrument are assembled. The latching mechanism serving to lock right pillow block 42A and main housing 40 against relative rotation includes a headed plunger 45, a coil spring 46, a latch 47, and a pivot screw 48 (Figs. 4 and 4A). As shown in those figures, plunger 45 and spring 46 are accommodated in a stepped opening in right pillow block 42A, the spring being positioned between the plunger head and the pillow block and acting constantly to urge the plunger to move in a direction along the plunger axis and substantially perpendicular to the pillow block upper surface so that the plunger head end projects somewhat beyond pillow block tongue 44A, as shown in Fig. 4. Latch 47 is mounted for pivotal movement on the pillow block by screw 48. One end of the latch is forked and in engagement with the plunger's lower or bottom end. The latch right end is freely disposed for engagement with a notch 49 (Figs. 4 and 4A) formed in the outer surface of the main housing 40. Thus, as long as plunger 45 is disposed upwardly, as shown in Fig. 4, right pillow block 42A and main housing 40 are locked against rotation relative to each other until the instrument is installed for use, the position shown in Fig. 4A. When the instrument is installed, the tongue on each pillow block is disposed within a groove 556 formed in the mounting plate 555 provided on the roof of the turret 526 and the plunger is forced downwardly to release the lock. The main housing then becomes free to rotate relative to the right pillow block, the parts assuming the relation shown in Fig. 4A.

*Optical system*

The optical system of the present fire control instrument is like that in any binocular instrument wherein two main sighting systems or telescopes are arranged to provide separate optical paths. The respective objective ends or these telescopes are disposed at a predetermined distance apart and the separate optical paths extend from the left, objective end to a left eyepiece and from the right, objective end to a right eyepiece. The optical paths of these main sighting systems are combined by using a collimating system and together function as a range finder to determine the range of a selected target.

*Main sighting systems*

The optical elements of the two main sighting systems are contained in three housings which are identified as a left end housing 55, a right end housing 55A (Figs. 1 through 3, 5, 9, 10 and 14), and an intermediate housing 56 (Figs. 9, 10 and 13). Left end housing 55 is attached to the left end of main housing 40; right end housing 55A is attached to the right end of the main housing; and intermediate housing 56 is supported partly within and partly outside of the main housing.

*Left and right end housings*

Left and right end housings 55 and 55A, respectively, and the optical components positioned in those housings are substantially identical to each other and, therefore, are interchangeable with each other on main housing 40.

Each end housing 55 has a tubular portion 57 (Figs. 3, 5 and 14) at the inner end of which (i. e., that end proximal to main housing 40) is an external flange 58 and at the opposite, outer end of which is a cover plate 59; this plate being attached in position on the end housing as by screws and dowels (neither of which is shown). Positioned in the inner end of the end housing is a cell 60 (Fig. 14) which contains an optical correction wedge 61 (Figs. 14 and 33) and which is adjustable rotatively about its own axis in the end housing. The wedge is used to correct horizontal (azimuth) deviation to permit interchangeability of end housing units 50. Positioned in the tubular portion wall, near the outer end, is a glass disc or window 62 (Figs. 5, 14 and 33). Both the wedge 61 and the disc 62 serve to keep out dust, moisture and other foreign matter from the end housing. A penta reflector is disposed between the window and wedge and comprises a first, front surface mirror 63 (Figs. 14 and 33) having a substantially full reflecting surface 64, and a second, front surface mirror 65 (Figs. 14 and 33) having a similar full reflecting surface 66. These mirrors are cemented, or otherwise bonded, to a connecting bar 68 so that the respective reflecting surfaces thereof are inclined at an angle of forty-five degrees with respect to each other thereby to produce a ninety degree deflection of the optical path through the end housing between the disc 62 and the correction wedge 61. Thus, the combination of mirrors functions like a penta prism and is, therefore, identified as a penta reflector.

Connecting bar 68 is similarly cemented, or otherwise bonded, to an arm 69 (Fig. 14) which is pivotally mounted on a base 70 (Fig. 14). The base 70, in turn, is pivotally mounted for rotation in a vertical plane normal to the axis of the instrument and relative to a tab 67 which is integral with cover plate 59. An adjusting screw 71 (Fig. 14) is provided and disposed in a manner that rotation of the screw causes arm 69 to pivot relative to the base 70 to provide one way of simultaneously adjusting the position of reflecting surface 66 relative to correction wedge 61 and the position of reflecting surface 64 relative to optical disc 62. A second adjusting screw 72 is provided on the base 70 the purpose of which is to effect adjustment of the mirrors 63, 65 in a vertical plane normal to the instrument axis and relative to tab 67. The adjustments of the correction wedge 61 and the penta reflector are preferably made prior to assembly of the end housings on the instrument.

Thus, the optical path of that portion of the main sighting system located in the end housings between disc 62 and correction wedge 61 is deflected through substantially ninety degrees, taking the following path, reckoned as progressing from the disc to the correction wedge: light rays from the target will enter through the disc 62 and strike reflecting surface 64; from that surface they will be reflected to reflecting surface 66; then, from the last-named reflecting surface, they will again be reflected through the correction wedge 61.

Once the end housings are assembled and adjusted, they are mounted, flanged end 58 foremost against the ends of main housing 40, being secured in place on the main housing by means of headed screws, or the like (not shown). It is essential, of course, that the lines of sight 53 from both end housings be aligned coplanar for the proper operation of the instrument. Thus, whenever the main housing is pivotally moved relative to the pillow blocks 42 and 42A, end housings 55, 55A will rotate correspondingly.

*Intermediate housing*

Intermediate housing 56 may be considered to comprise a first portion or optical tube 75 (Figs. 9, 10 and 13), which is located in main housing 40 between the open ends thereof, and a second portion or eyepiece assembly 76 (Figs. 1, 3, 5 through 10 and 13) joined to the first portion and located mainly outside the main housing extending through an opening 123 in that side of the main housing which is adjacent to the user of the instrument.

The intermediate housing first portion or optical tube 75 comprises a tubular body 77 (Figs. 13, 23 and 24) on opposite ends of which left and right tubular extensions 78, respectively (Fig. 13) are attached, as by threads 79 (Fig. 23) on those components. The intermediate housing first portion occupies substantially that half of the space within the main housing 40 located adjacent to the user of the instrument and the extensions thereof terminate short of the open ends of the main housing.

The intermediate housing first portion 75 is supported inside main housing 40 from the interior surface of main housing wall 110 (Figs. 1, 2, 5, 7, 9, 10 and 13), by coaxial left and right bearing blocks 111 (Fig. 13), which are attached to the main housing wall 110, as by screws (not shown). Each of the bearing blocks contains an antifriction bearing 112 (Fig. 23) which encircles the respective tubular extensions of the first portion, the antifriction bearing in each block being held therein by a retaining ring 113 (Fig. 23). The bearing blocks are so disposed that the axis of each antifriction bearing 112 is coaxial with the axis of the antifriction bearings 43 (Fig. 3) in the pillow blocks 42. Thus, the intermediate housing is rotatable relative to the main housing. This rotatable relation is necessary in order to provide for the eyepiece elements remaining stationary while the objective elements in the end housings 55 are rotated to elevate or depress the lines of sight 53 from the instrument with respect to the horizon.

Located between the extension ends and the open ends of the main housing 40 are certain optical components next in the series of the optical system following those in the end housings 55, 55A. These elements are common to both main sighting systems and comprise a window or disc 505, a filter 506 and a partial penta reflector 471. In addition thereto, the right optical system includes an optical compensator 339 located between the right filter 506A and the right partial penta reflector 471A.

The window or disc (Figs. 14 and 33) is contained in a tubular cell 507 which is sealed in each open end of the main housing by a retaining ring 508 and serves to close the otherwise open ends against infiltration of dust or other foreign matter, in the absence of the end housings 55, as well as to transmit light along the optical path from the objective to the eyepiece ends.

Filter disc 506 (Fig. 14) is a neutral contrast filter which is disposed a convenient distance from the next adjacent to the window 505. The filter serves to make observing easier by increasing contrast between the target image and the illumination of the reticles and scales. The disc is contained in a tubular cell 510 which is mounted on an arm 511. The arm is attached to a shaft 512 which is pivotally supported on the main housing 40 and is rotatable through the agency of a bevel gear 513 attached thereto thereby to dispose the filter in the optical path or remove it therefrom at the will of the observer. Transposition simultaneously of the filters disposed in the left and right systems is effected through a mechanical linkage whereby the bevel gears 513, are connected by a shaft 520 having bevel gears 519, 518 disposed on opposite ends thereof and operatively engaged with the bevel gears 513, associated respectively with the left and right filters. Movement is imparted through a mechanical arrangement connected with the right filter bevel gear 513A. The mechanical arrangement comprises a lever 515 (Figs. 3, 5, 7 and 14) attached to one end of a shaft 516 which extends through an opening in the wall of main housing 40. On the opposite end of the shaft a bevel gear 517 is mounted which is operatively engaged with filter bevel gear 513A. Thus, rotation of lever 515 will cause the filters 506, to be moved into or out of the optical path simultaneously.

Partial penta reflector 471 is located a convenient distance from the filter disc 506, on the opposite side thereof from the window 505. The purpose of this reflector is to connect optically the collimating system with the main sighting system. More complete details thereof will be described subsequently in conjunction with the collimating system.

Optical compensator 339 consists of two separate lens elements 460, 338 and functions as a variable range wedge to determine the range of a selected target in well known manner through the lateral translation of one lens with respect to the other lens. The two lenses comprise a stationary lens 460 (Figs. 14 and 33) and a ranging lens 338 (Figs. 14, 33 and 34). Because Figure 34 is a schematic drawing, it is to be understood that ranging lens 338 and the other components there shown may not be in the same positions relative to each other as they actually are in the instrument. Lens 460 is mounted in a stationary holder (not shown) disposed adjacent to filter 506A and ranging lens 338 is mounted in a sliding holder 461 (Fig. 34) which is provided with an internally threaded lug 462 (also see Fig. 14) and disposed adjacent to partial penta reflector 471A. In addition, holder 461 is slidably supported by the stationary lens holder so that lens 338 is slidably movable relative to the stationary lens 460. The mechanism for translating lens 338 will be explained later in the description.

Left and right tubular extensions 78, 78A, are identical to each other, insofar as the optical system is concerned, in that each extension is provided with a cell 82 which contains an objective lens 83 (Fig. 33). The objective lens is a two element achromatic lens, the purpose of which is to bring the incident rays to a focus at the image plane located at the collective lens (located in tubular body 77). This cell is secured in the tubular extension in any convenient manner, as by set screws or the like (not shown).

The tubular body 77 of the first portion accommodates optical elements which are common to both the left and the right optical systems. The elements of each of these systems considered in the order in which they are disposed in the optical system from the extensions 78 to the intermediate housing second portion 76, comprise a derotating prism unit 81 (Figs. 13, 23, 24 and 33), otherwise referred to herein as a prism unit, a collective lens 85 (Fig. 33), and a right angle prism 86 (Figs. 13 and 33).

Inasmuch as the present fire control instrument resembles a panoramic telescope, in one respect that is, where the objective optical elements (those contained in the main housing 40 and end housings 55) rotate and those optical elements comprising the binocular or eyepiece unit 50 remain stationary, a rotating prism is required to erect the tilting image caused by rotation of the objective lens elements.

In the present instrument, each prism unit 81 comprises a pair of optical prism elements 99 and 100 (Figs. 13, 24 and 33). Each prism element is cemented, or otherwise bonded, to separate plates 101, 102 (Figs. 23 and 24), respectively. The plates, in turn, are fastened, as by screws 103 (Figs. 13 and 24), to a prism holder 96, 96A so that the prisms can be adjusted thereby to dispose their adjacent reflecting surfaces parallel to each other and at a 45° angle with the optical axis. The reflecting surfaces are also separated by a very narrow space 104 (Figs. 24 and 33), the purpose of which space is to form a refractive medium between the prisms.

The Pechan prism units 81, are assembled or connected together by a tubular spacer 97 (Figs. 13 and 23) extending therebetween so that the prism holders, when oriented with respect to each other, are made to rotate simultaneously thereby to correct for image lean equally in the left and right sighting systems. The assembly of prism units is supported for limited rotation in tubular body 77 by means of pairs of bearings 95 (Figs. 13 and 23) positioned at the assembly left and right ends between that assembly and the tubular body. As shown partly in Fig. 13, the wall of tubular spacer 97 is provided with an opening 98. This opening permits the spacer to fit around a central prism holder 80 and is large enough to allow the prism unit to rotate in stationary tubular body 77 in consequence of rotation of the main housing 40 and of the end housings 55 relative to the pillow blocks 42. A differential gear mechanism 105 (Figs. 13, 23 and 25) is provided which is secured, as by screws or the like, to prism holder 96, and is arranged to rotate the prism assembly at one-half the speed that the main and end housings are rotated. The differential gear mechanism comprises a pair of spur gears 106, 107 mounted on an annular plate or holder 115, an internal ring gear 108 and an internal ring gear segment 109. The gears 106 and 107 (Figs. 13 and 25) are mounted parallel on individual shafts secured to the annular holder and are disposed in mesh with each other. The assembly of the annular holder with spur gears is secured to prism holder 96, thereby to impart rotation to the prism unit 81. The internal ring gear 108 is provided with gear teeth (Figs. 23 and 25) disposed on the internal surface of left tubular extension 78 and which are in mesh with gear 107. The internal ring gear segment 109 (a portion of which is shown in Figs. 13, 23 and 25) is provided as an extension of left bearing block 111 being attached thereto as by screws or the like (not shown). The segment is disposed to project toward the right (Figs. 13 and 23) from that bearing block in a direction parallel with the axis of tubular body 77; then to project radially inward, as viewed in Fig. 23, through an opening 114 (Figs. 23 and 25) in tubular extension 78, to mesh with gear 106 (Fig. 25) of differential mechanism 105, which mechanism is attached to prism unit 81.

Therefore, as main housing 40 and the end housings 55 attached thereto are rotated relative to the pillow blocks 42, bearing block 111 attached to main housing wall 110 rotates in unison with the main housing and internal ring gear segment 109 attached to that bearing block moves in a corresponding direction in an arcuate path, as viewed in Fig. 25, with reference to tubular extension 78. This movement of the internal ring gear segment rotates gear 106 (Fig. 25) with which it is engaged. This gear, in turn, rotates its mating gear 107. Inasmuch as gear 107 meshes with internal ring gear teeth 108 (Figs. 23 and 25) formed in tubular extension 78, which is a stationary member, prism unit 81 is rotated relative to the intermediate housing first portion 75 since it is secured to the gear support or holder 115; rotation of prism unit 81 is in the same direction as that of the main housing. The sizes of the gears are selected to impart a 2 to 1 ratio between the rotation of the main housing and the rotation of the prism assembly, which is essential with this arrangement to correct for image lean.

The collective lens 85 and the right angle prism 86 are mounted on a central prism holder 80 (Fig. 13) which is secured, as by the screws 84, to the wall of tubular body 77 approximately midway between that body's left and right ends. Collective lens 85 is accommodated in the central prism holder left end and next adjacent to the prism unit in the series of optical elements of the present instrument.

Positioned in central prism holder 80 adjacent collective lens 85, in a direction to the right of that lens in Figs. 13 and 33, is right angle prism 86 (Figs. 13 and 33) which has a substantially full reflecting surface 87. Prism 86 is cemented, or otherwise bonded, to a support 88 (a portion of which is shown in Fig. 13). This support, in turn, is secured, as by screws 89 to the central prism holder.

As shown in Fig. 13, the wall of tubular body 77 is provided with a pair of adjacently disposed openings 90 of convenient size. Similarly, central prism holder 80 is provided with a pair of adjacently disposed openings 91 (only one of which is shown) which are in alignment with the tubular body openings. The purpose of the tubular body and of the central prism holder openings is to allow for transmission of light in the binocular left and right optical systems between the intermediate housing first and second portions.

Thus, as indicated in Fig. 33, the optical path of the main sighting system located in the intermediate housing first portion 75, reckoned as progressing from the end housing 55 to the intermediate housing second portion 76 is as follows: light rays from reflecting surface 66 of front surface mirror 65 located in the end housing are transmitted successively through correction wedge 61 in the end housing and window 505 located in the open end of main housing 40; from window 505 the rays are transmitted through filter 506 and partial penta reflector 471 also located in main housing 40 to objective lens 83 located in the tubular extension 78; through objective lens 83 and prism unit 81 to collective lens 85; through collective lens 85 to right angle prism 86, where the light rays are deflected through an angle of 90° and projected through the housing openings 91, 90 toward the optical elements of the intermediate housing second portion.

The intermediate housing second portion 76 (Figs. 1, 3, 5 through 10 and 13) is the next and final optical unit in the main sighting system as considered from the objective to the eyepiece ends and may be considered as an optical tube comprising a series of small housings which are joined together. The housings making up second portion 76 will be herein identified as a medial housing 120 (Figs. 1 through 3, 5, 8 through 10 and 13), an off-set housing 121 (Figs. 1 through 3, 5 through 10 and 13) and an eyepiece housing 122 (Figs. 2, 3, 5 through 10 and 13).

Medial housing 120, as shown in Fig. 13, is a box-like member which is substantially open at its forward and its right ends. This housing is attached, as by screws (not shown), to the central portion of tubular body 77 (Fig. 13) with the medial housing open, forward end aligned with the tubular body openings 90; and with the medial housing open, right end facing toward the right in the figure just named. With the medial housing attached to the tubular body, the medial housing extends substantially perpendicular to the tubular body through the opening 123 (Figs. 9, 10, and 13) in the main housing wall 110 and outside of the main housing (Figs. 1 through 3, 5, 9 and 13).

In view of the fact that main housing 40 is rotated and the binocular intermediate housing 56 remains stationary, main housing opening 123 is made larger than would otherwise be necessary in order to provide clearance for the intermediate housing. In order to seal opening 123 against loss of a gaseous desiccant (not shown), which is pumped into the instrument after assembly, and also to prevent foreign matter from entering the instrument through that opening, there is provided a tube-like, flexible diaphragm 124 (Figs. 1 through 3, 5, 8 through 8B, and 13) made of rubber, or like material. One end of this diaphragm is held against main housing 40 by a clamp ring 125 (Fig. 13) which is secured, as by screws (not shown), to the main housing; and the other end of the diaphragm is similarly held against medial housing 120 by a clamp ring 126 (Fig. 13) which is secured, in similar manner, to the medial housing.

Positioned in medial housing 120 are right angle prisms 127, (Figs. 13 and 33) having substantially full reflecting surfaces 128. Each prism is cemented, or otherwise bonded, to a support 129 (Fig. 13) which is secured, as by the screws 130, to a tab (not shown) integral with a mounting ring 119 (Fig. 13). This ring is accommodated in medial housing 120 for adjustment in a rotary direction about its own axis so that reflecting surface 128 can be tilted enough to deflect the optical path through substantially ninety degrees and, at the same time, deflect the optical path obliquely downward with reference to that portion of the optical path in the intermediate housing first portion 75, as indicated in Fig. 33. This adjustment of ring 119, preferably, is done when binocular 59 is assembled and prepared for mounting in main housing 40. After being placed in the proper position, the ring is secured in place in the medial housing, as by set screws, or the like (not shown).

Off-set housing 121 (Figs. 1 through 3, 5 through 10 and 13) is an elongated tube-like member having a box-like portion 131 (Figs. 3, 5 through 10 and 13) at its right end. As shown in Fig. 13, off-set housing 121 is open at its left end and is provided with another opening at the opposite end facing rearwardly. This housing is attached, as by screws (not shown), to medial housing 120 with its open, left end connected to the medial housing open right end. With the off-set housing attached to the medial housing, the off-set housing extends substantially parallel to the intermediate housing first portion 75, as viewed in Figs. 9 and 13; but also extends obliquely downward and toward the right relative to the first portion and relative to main housing 40 (Figs. 9 and 10) until the off-set housing portion 131 assumes a position in space near the right pillow block 42A (Figs. 3, 5, 7 and 9).

Positioned in each binocular optical system in the off-set housing are two achromatic lenses 138, 139 which comprise the lens erecting system and a right angle prism 132 (Figs. 13 and 33). The purpose of the lens erecting system is to produce an inversion and reversion of the image and bring the rays to focus in the focal plane of the eyepiece. Each of the erecting lenses are mounted respectively in axially aligned cells 136 and 137 (Fig. 13). Cells 136 and 137 are adjustably positionable in the off-set housing so that the erecting lenses in the respective cells can be positioned properly in the optical system. Preferably, the position of cells 136 and 137 is established when the binocular is assembled and after each cell is in the proper position, it is secured in place in the off-set housing, as by set screws (not shown). The right angle prism 132, which has a substantially full reflecting surface 133, is cemented, or otherwise bonded, to a support 134 (Fig. 13) secured, as by screws 135, to the off-set housing portion 131. The reflecting surface 133 is substantially parallel to reflecting surface 128 of the prism 127 (Figs. 13 and 33), and the prisms 132 are so oriented with respect to the right open end of the off-set housing that light rays will be projected into the eyepiece housing attached thereto.

Eyepiece housing 122 (Figs. 2, 3, 5 through 10 and 13) is a hollow member which is open at its forward and at its rear ends. This housing is attached, as by screws (not shown), to the off-set housing right end portion 131 with the eyepiece housing open, forward end connected to the off-set housing open, rear end. The eyepiece housing is a twin-tubular assembly accommodating optical elements which are common to both the left and the right optical systems for magnifying the target image as well as the reticle and scale images of the collimator system. The left and the right eyepiece assemblies 140 are disposed in side-by-side relation and comprise a rhomboid prism 142 (Fig. 33) having substantially full reflecting surfaces 143 and 144, a field lens 145 (Fig. 33) and an eye lens 146 (Fig. 33). These optical elements are disposed appropriately in the order stated in the optical system to transmit light from the right angle prism 132 located in the off-set housing 121 to the eye 148 of an observer. Additionally, eyepiece assembly 140 is provided with a diopter adjustment ring of well known form (not shown) for use in focusing the images appearing at eye lens 146 according to requirements of the person using the instrument. Provision is also made for adjusting the distance between eyepiece assemblies 140 and 140A to suit the interpupillary dimension of the person using the instrument. This adjustment is made by rotating a knob 141 (Figs. 3, 5 and 7) called the interpupillary knob.

Thus, as indicated in Fig. 33, the optical path of the main sighting system located in the intermediate housing second portion 76, reckoned as progressing from the right angle prism 86 in the first portion to the eye lens 146 is as follows: light rays from right angle prism 86 are transmitted to right angle prism 127; from right angle prism 127, the light rays are deflected 90 degrees obliquely downward through erecting lenses 138 and 139, in turn, to right angle prism 132; from right angle prism 132, the light rays are again deflected 90 degrees in a horizontal path through rhomboid prism 142; from rhomboid prism 142 the rays are further transmitted through field lens 145 and eye lens 146 where they are picked up by the eyes of an observer. In order to facilitate support of the eyepiece end of the intermediate housing second portion, as well as to render the intermediate housing relatively stationary with respect to the main housing, the off-set housing portion 131 is connected to right pillow block 42A by a link 147 (Figs. 3, 7 and 9).

*Auto-collimating system*

The auto-collimating system of the present fire control instrument serves not only to correlate the lines of sight of the left and the right optical systems of the main sighting system, but also to introduce discrete images representing certain ballistic factors into the main sighting system thereby to enable the user of the instrument to observe directly the superelevation factors introduced for properly elevating the armament for firing at a selected target.

The auto-collimator 51 components are contained, for the most part, in a housing 150 which occupies substantially the other half of main housing 40, that is, that half of the housing located on the opposite side of the intermediate housing from the observer.

The auto-collimator 51 is somewhat symmetrical in design, that is, the optical elements disposed on opposite sides of the mid-point of the system are common to both sides and are disposed in the same relation to each other except in an opposite sense. The system includes a scale transfer prism 175 at the mid-point thereof and disposed between that prism and the partial penta reflectors 471 located in the main sighting systems are stereoscopic reticle units 165, pairs of collimator lenses 158, 161, pairs of correction wedges 152, 154 and penta reflectors 470, in the order mentioned. A scales-gun reticle unit 52 is provided as part of the collimating system, the function of which is to superimpose discrete images of the ballistic factors introduced for effecting proper correction of superelevation of the gun above the line of sight of a selected target onto the field of view of an observer using the instrument.

The stereoscopic reticle units 165 function to correlate the lines of sight of the two main sighting systems and are disposed next adjacent to and on opposite sides of the scale transfer prism 175. Each unit comprises a tubular housing 166 (Figs. 11 and 12), a tubular cell 167 which fits concentrically inside that tubular housing, and a stereoscopic reticle assembly 168 (Figs. 12, 33 and 35) comprising an optical disc 162 on which a mask (not shown) containing a stereoscopic reticle pattern 169 (Figs. 35 and 36) is cemented or otherwise bonded.

In Figs. 32, 35 and 36, stereoscopic reticle pattern 169 is shown as a group of parallel, opaque lines arranged in a V formation. This has been done only for convenience of drawing. In reality, stereoscopic reticle pattern 169 is a group of very narrow, rectangular, transparent areas or openings arranged in V formation on an opaque mask. The mask is oriented in convenient fashion so that the reticle pattern will appear in the field of view of the instrument in a preselected position. This position preferably would be just above the center of the field of view with the vertex of the pattern disposed vertically aligned and centered with respect to a gun reticle pattern 240. The reticle mask does not cover the entire disc 162 but only a sufficient portion thereof necessary to superimpose the reticle pattern upon the field of view. The remainder of the disc is left clear for transmission of other discrete patterns which will be identified subsequent hereto.

In order to illuminate the stereoscopic reticle assemblies 168 (Figs. 12 and 33) in such a way that light rays will pass through the rectangular openings forming stereoscopic reticle patterns 169 (Figs. 35 and 36) thereby to superimpose the patterns upon the field of view and have them appear as lighted areas, there are provided an electric bulb 211 (Fig. 33), a condenser lens 212 (also Fig. 33), and a right angle prism 213 (Figs. 11, 12 and 33). The bulb is positioned in a separate housing (not shown) supported by floor 188 of main housing 40 and is located below the stereoscopic reticle unit 165. The condenser lens is mounted above the bulb in an opening in the top of the separate housing which extends through an opening (not shown) in the floor of collimator housing 150. The prism is cemented, or otherwise bonded, to the disc 162 of stereoscopic reticle assembly 168. The prism is located on the side of the disc opposite that from the scale transfer prism 175 and above the condenser lens so that, when the bulb is illuminated, light rays from the bulb will pass through the condenser lens and fall upon a partial reflecting surface 214 (Figs. 12 and 33) of prism 213 from whence those rays are reflected to the mask delineating stereoscopic reticle pattern 169. Illumination of bulbs 211, 211A is controlled by a conventional rotary type, multiple contact, electrical switch (not shown) operated by a knob 215 (Figs. 5 and 7) whereby the images delineating the stereoscopic reticle pattern can be superimposed upon the field of view at the will of the operator. Intensity of illumination is also controlled at the will of the operator through a rheostat or variable resistor (not shown) in the electrical circuit connected with the bulbs and which is operated by a knob 216 (Fig. 5).

Thus, it will be understood that, when left stereoscopic reticle assembly 168 is illuminated, light passing through the rectangular areas forming the left stereoscopic reticle pattern 169 is projected into the right optical system of binocular 50 so that the image 169$i$ (Fig. 32) of that reticle pattern can be seen upon looking into the binocular right eyepiece 140A (Figs. 3, 5 and 7); and when right stereoscopic reticle assembly 168A is illuminated, light passing through the rectangular areas forming right stereoscopic reticle pattern 169A is projected into the left optical system of binocular 50 so that the image 169A$i$ (Fig. 32) of that reticle pattern can be seen upon looking into the binocular left eyepiece 140 (Figs. 3, 5 and 7).

Of course, when the binocular eyepieces 140 are looked into simultaneously, as would be the case when both images of the stereoscopic reticle patterns are in use, image 169$i$ of left stereoscopic reticle pattern 169 and image 169A$i$ of right stereoscopic reticle pattern 169A are in substantial congruence with each other so that both appear as one image. For convenience of description, the image formed by the substantial congruence of images 169$i$ and 169A$i$, as seen upon looking into eyepieces 140 and 140A simultaneously, is identified by the reference character 164 (Fig. 28).

In order to effect congruence of the reticle images, tubular housing 166, as indicated by the dashed lines drawn above that housing in Fig. 12, is adjustably positionable in the collimator housing in a vertical direction; and tubular cell 167, as indicated by the dashed lines drawn to the right of that cell in Figs. 11 and 12, is adjustably positionable in a direction along its own axis relative to tubular housing 166.

To provide for adjusting the position of tubular cell 167 relative to tubular housing 166, there is an eccentric 170 (a portion of which is shown in Fig. 11). One portion (not shown) of this eccentric is so engaged with cell 167 that, as the eccentric is rotated in a clockwise or in a counterclockwise direction, as viewed in Fig. 11, the cell is moved in a direction along its own axis in tubular housing 166. As cell 167 is so moved, stereoscopic reticle pattern 169 contained in stereoscopic reticle assembly 168 positioned in that cell is moved, in a direction from left to right, or vice versa, with reference to collimating lenses 158 and 161 so that the stereoscopic reticle patterns can be placed in the focal plane of those lenses.

Tubular housings 166, in being adjustably positioned in collimator housing 150, move on rails 171 (Fig. 11) in a direction toward or away from the reader, as the case may be. These rails are in engagement with the tubular housings and are secured to collimator housing 150 so that the rails serve to define the paths along which the tubular housings and stereoscopic reticle patterns 169 positioned in cells 167 carried by those housings are movable.

In order to adjustably position each tubular housing 166 in housing 150, there are provided: a headed jack screw 172 (Fig. 12) against the head of which tubular housing 166 is constantly urged, as by springs, or the like (not shown); a gear 173 (Figs. 11 and 12) having an internally threaded hub, which hub is shown in the last-named figure; and a gear 174 (Figs. 11 and 12) which meshes with gear 173. These parts are appropriately supported by collimator housing 150.

The head of jack screw 172 is in engagement (not shown) with rail 171 so that rotation of the screw about its own axis is prevented; and, as indicated in Fig. 12, the threaded shank of the screw engages with the internally threaded hub of gear 173. Therefore, as gear 174 is rotated, its mating gear 173 is rotated correspondingly. Inasmuch as the head of the jack screw 172 does not rotate, the screw moves up or down, as viewed in Fig. 12, and thus moves tubular housing 166 along rail 171 (Fig. 11). As the tubular housing is so moved, left stereoscopic reticle pattern 169 is moved up or down, as the case may be, with reference to right collimating lenses 158A and 161A so that the image 169i (Fig. 32) of the stereoscopic reticle pattern, as seen upon looking into right eyepiece 140A (Figs. 3, 5 and 7), can be positioned as needed in an up or down direction in Fig. 32, in that eyepiece field of view.

The positioning of tubular housing 166 in collimator housing 150 and the positioning of tubular cell 167 in the tubular housing, preferably, are done when collimator 51 is assembled and prepared for mounting in main housing 40. Once adjusted, the cell is secured in place, as by set screws (not shown) located in the tubular housing.

To provide for readily adjusting the position of the right stereoscopic reticle to the same height as the left stereoscopic reticle once the collimator is installed in the main housing, there is a gear train comprising the gears 195 and 196 (Figs. 11 and 12) mounted on a shaft 197, the gears 198 and 199 (Fig. 12) mounted on a shaft 200, the gears 201 and 202 (Fig. 11) mounted on a shaft 203, a gear 204 (Fig. 11) and a knob 205 (Figs. 3, 5 and 11), referred to as the halving knob, mounted on a shaft 206 (Fig. 11); the just-identified shafts being supported for rotation in convenient manner (not shown). Gear 195 meshes with gear 163, gear 196 with gear 198, gear 199 with gear 201, and gear 202 with gear 204. Therefore, rotation of halving knob 205 results in rotation of gear 163 (Figs. 11 and 12) and movement of jack screw 172A (Fig. 12) in a vertical direction (i. e., in a direction from top to bottom, or vice versa, of the drawing sheet in Fig. 12), and consequent movement of tubular housing 166A in collimator housing 150.

In Fig. 26, image 169Ai of right stereoscopic reticle pattern 169A, which image is projected into the binocular left optical system, appears displaced a certain amount, exaggerated for illustrative purposes, directly below (i. e., toward the bottom of the drawing sheet in that figure) image 169i of left stereoscopic reticle pattern 169, which image is projected into the binocular right optical system. By rotating halving knob 205, thereby causing movement of tubular housing 166A, image 169Ai can be displaced back (i. e., toward the top of the drawing sheet in Fig. 26) toward image 169i so that those images, as seen upon looking into the binocular eyepieces 140 and 140A simultaneously, appear to be in substantial congruence with each other, thus forming image 164 (Fig. 28).

The pairs of collimator lenses 158, 161 are disposed next in the order of optical elements in the collimating system. These lenses are contained in an assembly comprising two tubular cells 157, 160. The two lenses in each assembly are achromatic doublets and serve as the left and right objectives of the collimating system. The doublets are adjustable with respect to each other and also as a combination in order to effect perfect focus. Tubular cell 157 contains collimating lens 158 and tubular cell 160 contains collimating lens 161, the latter cell and lens being located next adjacent to stereoscopic reticle assembly 168.

Positioning of cell 157 in an axial direction in housing 150, and the positioning of cell 160 in cell 157 are done preferably when the collimator is assembled and prepared for mounting in main housing 40. To prevent cell 157 from rotating relative to housing 150 and yet allow the cell to be adjusted in axial directions, a screw 159 is disposed on the cell 157, the head of which is located in a slot (not shown) in housing 150. When those cells are in their proper positions, cell 157 is secured in place in housing 150, as by set screws (not shown) located in that housing; and cell 160 is similarly secured in place in cell 157, as by set screws (not shown) located in cell 157.

Positioned in opposite ends of housing 150 are the pairs of correction wedges 152, 154, each contained, respectively, in a tubular cell 151, 153 (Figs. 11 and 12).

Cell 151 is adjustable rotatively about its own axis in housing 150 so that correction wedge 152, contained in that cell, can be positioned with reference to its complementary correction wedge 154. Positioning of cell 151 and correction wedge 152 is done preferably when the collimator is assembled and prepared for mounting in main housing 40 (Fig. 9). Adjustability of left cell 153 is provided by a worm 155 (Figs. 11 and 12) which is supported for rotation on housing 150. This worm engages worm gear teeth 156 (Fig. 12) formed in the cell circumferential outer surface. Rotation of the worm causes rotation of cell 153 in housing 150 and consequent rotation of correction wedge 154 in that cell. After being adjusted, cells 151, 153 are secured in place in housing 150, as by set screws (not shown) located in that housing.

Right cell 153A is used as an internal correction wedge during operation of the instrument. This cell is rotatively adjustable from outside the main housing at anytime after the collimator is assembled in the main housing. The purpose for providing this adjustment is to compensate for visual anomalies of the observer as well as to correct for any minor disturbances which may affect range calibration by adjusting optical correction wedge 154A (Fig. 12) relative to stereoscopic reticle pattern 169 (Fig. 35) and relative to optical correction wedge 152A (Fig. 12) so that image 169i (Fig. 27) of stereoscopic reticle pattern 169 is substantially congruent with image 169Ai of stereoscopic reticle pattern 169A.

Adjustment of cell 153A is effected by a knob 207 (Figs. 3, 5 and 11) which is called the internal correction knob, a shaft 208 (Fig. 11) and intermeshing gears 209 and 210 (also Fig. 11). The knob and gear 210 are secured to the shaft which is supported for rotation in convenient manner (not shown), and gear 209 is secured to right worm 155A which is supported for rotation by collimator housing housing 150. Therefore, rotation of the knob causes corresponding rotation of cell 153A (Figs. 11 and 12) and attendant rotation of correction wedge 154A (Fig. 12) positioned in that cell relative to left stereoscopic reticle pattern 169 and relative to correction wedge 152A (Fig. 12). The action resulting from rotation of internal correction knob 207, which is observable at the binocular eyepieces 140 (Figs. 3, 5 and 7) upon looking into those eyepieces simultaneously, can be understood from Fig. 27 wherein the field of view of the binocular is represented by the circular area.

In Fig. 27, image 169i of stereoscopic reticle pattern 169 appears displaced a certain amount directly to one side (i. e., to the right in that figure) of image 169Ai of stereoscopic reticle pattern 169A. By rotating knob 207, thereby causing rotation of correction wedge 154A, image 169i can be displaced sufficiently toward image 169Ai so that those images appear to be in substantial congruence with each other, thus forming image 164 (Fig. 28).

In order to project the discrete images of the stereoscopic reticle patterns into the optical system and also in order to project the images originating in the scales-gun reticle unit into that system there are provided the penta reflectors 470 (Figs. 9, 10, 14 and 33), which are located outside of collimator housing 150 within main housing 40.

Reflector 470 comprises, essentially, a front surface mirror 472 (Figs. 14 and 33) having a substantially full reflecting surface 473 and a front surface mirror 474 having a substantially full reflecting surface 475. These mirrors are cemented, or otherwise secured, to a tie bar 476 (Fig. 14) so that their respective reflecting surfaces are inclined toward each other, as viewed in Figs. 14 and 33, at an angle of forty-five degrees.

Tie bar 476, in turn, is similarly cemented, or otherwise secured, to a support 477 (Fig. 14), which is connected to a base 478 (Fig. 14) for adjustable pivotal movement relative to the base; this connection being effected by a pivot pin (not shown, but similar to the pivot pin 492 shown in Figs. 15 and 16). The pivot pin passes through a lug (not shown, but similar to the lug 493 shown in Figs. 15 and 16) on support 477 and projects, at each end, into the opposed spaced lugs 479 (one of which is shown in Fig. 14) which are integral with base 478.

Between support 477 and base 478 is a coil spring (not shown, but similar to the coil spring 495 shown in Fig. 15) which acts constantly to pivot the support relative to the base; the position of the support relative to the base being controlled by the headed adjusting screw 480 (Fig. 14) which extends between those members and which is used in similar manner to the screw 496 shown in Fig. 15. The purpose of providing for pivotal movement of support 477 relative to base 478 is to facilitate the positioning of reflecting surfaces 473 and 475 of mirrors 472 and 474, respectively, on tie bar 476 (Fig. 14) relative to each other.

Reflector 470 is positioned in main housing 40 (Fig. 9) near the left end of collimator 51 and is adjustable so that reflecting surfaces 473 and 475 (Fig. 33) forming parts of that reflector are in the desired relationship to collimator 51 and to partial penta reflector 471, respectively; reflecting surface 473 being positioned with reference to the collimator correction wedge 152, and reflecting surface 475 being positioned with reference to reflecting surface 486 of reflector 471. After being positioned and adjusted in main housing 40, reflector 470 is secured in position by screws 481 (one of which is shown in Fig. 14).

Partial penta reflector 471 comprises a front surface mirror 485 (Figs. 14, 16 and 33) having the substantially full reflecting surface 486 and a front surface mirror 487 (Figs. 14 through 16 and 33) having a surface 488 which is partially reflecting and partially transparent. These mirrors are cemented, or otherwise attached, to a tie bar 489 (Figs. 14 through 16) so that the respective reflecting surfaces are inclined toward each other at an angle of forty-five degrees.

Tie bar 489 is attached to a support 490 (Figs. 14 and 15) which, in turn, is connected to a base 491 (Figs. 14 through 16) for adjustable pivotal movement relative thereto; this connection being effected by the pivot pin 492 (Figs. 15 and 16) which passes through the lug 493 on the support and extends, at each end, into opposed, spaced lugs 494 (Fig. 16). These lugs are a part of base 491 and are astride the support lug 493.

Disposed between support 490 and base 491 is the coil spring 495 (Fig. 15) which acts constantly to pivot the support relative to the base about the axis of pivot pin 492; the position of the support relative to the base being controlled by the headed adjusting screw 496 (Figs. 14 and 15). The purpose of providing for the pivotal movement of support 490 relative to base 491 is to facilitate proper positioning of reflecting surfaces 486 and 488 of mirrors 485 and 487 respectively in the optical system. To facilitate the positioning of reflector 471, the reflector base 491 is provided with a locating lug 497 (Figs. 15 and 16) which fits into an accommodating recess (not shown) in the main housing. After the position of reflector 471 is established, that reflector is secured in position in the main housing by screws 498 (Fig. 14).

From the previous explanation relating to reflectors 470 and 471, it can be understood that those reflectors, through the agency of their respective reflecting surfaces 473, 475, 486 and 488, serve to couple optically the left end of collimator 51 with the left optical system of binocular 50. That is to say, when stereoscopic reticle pattern 169A (Fig. 36) is illuminated, light rays projected through the translucent areas forming that pattern exit from the collimator left end through optical correction wedge 152 (Fig. 33) and pass to reflecting surface 473; the rays then are reflected by that surface to reflecting surface 475 from whence they are reflected to reflecting surface 486; from reflecting surface 486 they the reflected to reflecting surface 488 and then reflected by that reflecting surface into the binocular left optical system so that image 169A$i$ (Fig. 32) of the steroscopic reticle pattern may be seen as bars of light upon looking into the left binocular eye lens 146. Similarly, the reflectors 470A and 471A serve to couple optically the right end of collimator 51 with the right optical system of binocular 50. Hence, the image 169$i$ of the stereoscopic reticle pattern may be seen upon looking into the right eye lens 146A.

The scales transfer prism 175, located at the mid-point of the collimator housing and system, is to aid in projecting images originating in the scales-gun reticle unit 52 (Figs. 9 through 11, 17 and 33) optionally either into the left or the right optical system. This prism is made up of two right angle prisms which are joined together, as by cement or the like, along their diagonal surfaces; the diagonal surface of each prism having been coated previously to such joining, so that a partial reflecting surface 176 (Figs. 11 and 33) of substantially equal transmission and reflection characteristics is created.

Transfer prism 175 is cemented, or otherwise bonded, to an angular seat 177 (Figs. 11 and 19) one leg of which, as there shown, is provided with a circular lug 178. Through the agency of this lug, seat 177 is positioned on a support 179 (Figs. 11 and 19), the lug fitting into an accommodating opening in the support. Serving to hold the seat onto the support is a pressure plate 180 (Fig. 19). This plate is attached to lug 178, as by headed screws (not shown).

Transfer prism 175 is adjustably positionable in a clockwise or in a counterclockwise direction, as viewed in Fig. 12 and as indicated by the double arrowed, arcuate line 194, relative to support 179; this being provided so that partial reflecting surface 176 can be oriented to appropriately reflect the scales images into either the left or the right binocular optical systems.

Support 179 is mounted in housing 150 between a plate 181 (Fig. 19) and a bearing 182, the plate being attached to the housing, as by screws or the like (not shown), and the bearing being held in the housing by a retainer secured by the screw 183 (Fig. 19). The axis of the support's rotation is disposed in the plane of the transfer prism partial reflecting surface 176, as indicated in Fig. 11.

For rotating support 179 to one or the other of the positions in housing 150, a lever 184 (Figs. 5, 11, 12, 19 and 33) is provided which is connected to support 179 in the manner shown in Fig. 19. In that figure, it can be seen that the lower end of the support projects somewhat through the floor 185 of housing 150 and is provided with an arm 186. This arm is secured, at one end, to the support, as by use of a pin or the like (not shown) and is provided at its other end with a yoke 187. A plate 189 is secured in convenient manner (not shown) to the floor 188 of main housing 40. Extending through this plate and projecting somewhat from each face thereof is a shaft 190 (Fig. 19) which is supported for rotation by a bearing 191 accommodated in plate 189; the axis of the shaft being coaxial with the pivotal axes of support 179. Secured in convenient manner (not shown) to the inner end of shaft 190 (i. e., that end toward support 179 in Fig. 19) is an arm 192. This arm is provided with a lug 193 which projects from the arm, in a direction parallel to the axis of shaft 190, into mating engagement with yoke 187.

In Figs. 11 and 19, lever 184, support 179, seat 177, and transfer prism 175 are shown in the first position, at which time the partial reflecting surface 176 (Fig. 11) is also in the first position. When partial reflecting surface 176 is in the first position, images originating in the scales-gun reticle unit as well as images of the stereoscopic reticle pattern 169 are projected through the optical elements in that portion of the collimator to the left of the transfer prism in Fig. 33; then are projected into the binocular left optical system.

When lever 184, support 179, seat 177, and transfer prism 175 are rotated to the second position, which is not shown but is represented in Fig. 33 by a portion of that lever shown in broken line outline, the partial reflecting surface 176 is also rotated in the same direction to the second position indicated by broken lines in Fig. 33. In this second position, images originating in the scales-gun reticle unit are projected through the optical elements in that portion of the collimator to the right of the transfer prism in Fig. 33 into the binocular right optical system. However, when partial reflecting surface 176 is in this second position, a portion of support 179 and a portion of angular seat 177 intercept the optical path through collimator 51. This interception of the optical path does not prevent partial reflecting surface 176 (Figs. 11 and 33) of prism 175 from projecting the images originating in scales-gun reticle unit 52 through the optical elements in that portion of the collimator to the right of the transfer prism in Fig. 33, but it does prevent light rays which pass through stereoscopic reticle pattern 169 from being projected into the binocular right optical system, and its also prevents light rays which pass through stereoscopic reticle pattern 169A from being projected into the binocular left optical system. Therefore, as a result of this interception of the optical axis, the images of the stereoscopic reticle patterns cannot be seen at the respective eyepieces 140 (Figs. 3, 5 and 7); consequently, stereoscopic contact with a target selected cannot be established and target range cannot be determined in the position stated.

Scales-gun reticle unit 52 (Figs. 9 through 11, 17 and 33) is provided to furnish discrete images representative of corrections for superelevation in accordance with a plurality of calculated ballistic factors and to project such images into the field of view of binocular 50. In the present instrument, the images are those indicative of adjustments for range, the gun laying sighting reticle and the type of ammunition being used. These images are provided by three, separate, rectangular, slidable scales or bars representing, respectively, range 220, the gun laying reticle 221 and the types of ammunition 222.

In describing the construction of scales-gun reticle unit 52, it is expedient to begin with the base plate 226 (Figs. 17 and 18). Secured, as by the screws 227 (Fig. 17), to this base plate, near its left end, is an end block 228 (partially shown); and similarly secured to the base plate, near the right end is a corresponding end block 229 (also see Fig. 18). Between the end blocks 228 and 229, two lead screws 230 and 231 (Figs. 17, 18 and 34) are supported in spaced, parallel relationship to each other and to base plate 226. Lead screw 230 is in threaded engagement with range bar 220 and lead screw 231 is in similar threaded engagement with gun reticle bar 221.

The range and the gun reticle bars 220 and 221, respectively (Figs. 17 and 18), are so situated on base plate 226 that each bar is slidable in directions parallel to the axis of its respective lead screw, but it is also prevented from rotating with that lead screw.

Range bar 220 (Figs. 17 and 18) has one longitudinal edge thereof supported for sliding movement upon the upper surface of base plate 226. Projecting from the lower surface of range bar 220 is a tongue 232 (Fig. 18) which is in sliding engagement with a groove 233 formed in the base plate upper surface. As shown in Fig. 17, this groove is parallel to lead screw 230 and extends between end blocks 228 and 229 so that, upon rotation of lead screw 230, the range bar is movable as necessary throughout the distance between those end blocks.

In the upper surface of range bar 220 is an elongated insert 234. This insert is made of translucent glass, or like material, and is securely lodged, in convenient manner in an opening 236 formed in bar 220 adjacent to one edge thereof and parallel to lead screw 230. On insert 234 there are provided graduations 235 significant for establishing the range of a target upon stereoscopic contact therewith.

Gun laying reticle bar 221 (Figs. 17 and 18) rests for sliding movement on the base plate upper surface juxtapositional with range bar 220. As can be seen in Figs. 17 and 18, a portion of that range bar overlaps a portion of the gun reticle bar with a sliding contact existing between those bars. This is done to prevent light rays from passing between the range and the gun reticle bars. Projecting from the lower surface of gun reticle bar 221 is a tongue 237 which is in sliding engagement with a groove 238 formed in the base plate upper surface. This groove is parallel to lead screws 230 and 231 as well as to groove 233 and extends between end blocks 228 and 229. Thus, upon rotation of lead screw 231, the gun reticle bar is movable as necessary throughout the distance between those end blocks.

In the upper surface of gun reticle bar 221, an elongated insert 239, similar to range scale insert 234, is disposed in an elongated opening 242 (Fig. 17) formed in bar 221 and is arranged parallel to lead screw 231. A gun reticle pattern 240 (Fig. 17), which is made up of a plurality of short lines arranged in T formation, is provided on the insert.

Ammunition bar 222 (Figs. 17 and 18) is disposed in juxtaposition to gun reticle bar 221 on the side thereof opposite to range scale bar 220 and rests for sliding movement upon the base plate upper surface. As can be seen in Figs. 17 and 18, a portion of gun reticle bar overlaps a portion of the ammunition bar with a sliding contact existing between those bars, in order to prevent escape of light between those bars.

Ammunition bar 222 is attached to base plate 226 for sliding movement thereon by means of shoulder screws 245 (one of which is shown in each of Figs. 17 and 18). As can be understood from Fig. 18, the head 246 of each screw is accommodated, for sliding movement, in a stepped groove formed in the lower surface of base plate 226, the body 247 thereof being accommodated in the narrow portion 248 of the stepped groove. The remainder of each screw is threaded and extends through an opening in the ammunition bar and thence into a nut 249. As shown in Fig. 17, slot 248 is parallel to lead screws 230 and 231, as well as to grooves 233 and 238 and extends between end blocks 228 and 229 so that the ammunition bar is movable throughout the distance between those end blocks.

In the upper surface of ammunition bar 222 is an elongated insert 250 which, like inserts 234 and 239, is made of translucent glass, or like material, and is securely lodged in a correspondingly elongated opening 251 formed in the ammunition bar along one edge thereof and parallel to opening 242 in gun reticle bar 221. On insert 250 are markings 252 significant of the type of ammunition selected for use. Each ammunition marking is identified by appropriate letters formed in the opaque material on the insert. In Figs. 17 and 32, for example, one of the ammunition markings is identified by the letters "AP" which stand for an armor piercing type of ammunition. Other ammunition markings may be similarly identified, such, for example, as the letters "HEAT" (Fig. 29) which stand for a high explosive, antitank type of ammunition, and the letters "HVAP" (Fig. 31) which stand for a high velocity, armor piercing type of ammunition.

Additionally, to facilitate later bore sighting of the instrument to the armament with which it is to be used, there is included on the ammunition scale a marking called the ammunition bore sighting mark which is identified by the letters "BI" (Fig. 30).

In the figures, range scale markings 235, gun reticle pattern 240 and ammunition markings 252 exposed to view are represented as opaque lines on their respective inserts. Although such could be the case, these markings are so represented merely for convenience of drawing because those markings, as they actually appear, do not readily lend themselves to being shown satisfactorily. Actually, the markings appear as translucent areas against an opaque background.

Translation of ammunition bar 222 is imparted through a rack and pinion arrangement comprising a rack 254 (Figs. 17, 18 and 34), which is attached to one side of that bar, as by the headed screws 253 (Figs. 17 and 18), and a pinion 255 (Fig. 34), which is secured to a shaft 256 supported for rotation on the main housing 40.

Above the bars and extending between end blocks 228 and 229 (Fig. 17), to which blocks they are secured, as by the screws 260 and the dowels 261, are guide plates 262 and 263 (also see Fig. 18). As shown in Fig. 17, guide plate 262 is provided with an opening 264 through which only a portion of range bar insert 234 and some of the range scale graduations 235 thereon are exposed to view. Secured within this opening, in a recess 265 (Fig. 17) provided in the guide plate, is stationary oblong insert 266 made of translucent glass or like material. This insert is provided with a range reference mark 267 (Fig. 17), of triangular or other convenient shape, to designate the range of a target from the range scale graduations 235.

As shown in Fig. 17, guide plate 263 is provided with a stepped portion 268 which exposes to view insert 239 and the entire gun reticle pattern 240 on that insert; and guide plate 263, additionally, is provided with an opening 269 (Fig. 17) through which a portion of insert 250 and some of the ammunition markings 252 thereon are exposed to view.

Lying over opening 269, in a recess 270 provided in guide plate 263, is an oblong insert 271, made of translucent glass or like material. This insert is secured in the recess in any convenient manner (not shown) and is provided with a range reference mark 272 (Fig. 17), of triangular, or of other convenient shape, to designate the type of ammunition selected for use and for which correction has been introduced into the instrument.

In Fig. 17, range reference mark 267 and ammunition reference mark 272 are represented as opaque, triangularly shaped marks on their respective inserts 266 and 271. Although such could be the case, this reference mark is so represented merely for convenience of drawing because that reference mark, as it actually appears, does not readily lend itself to being shown satisfactorily. Actually, these reference marks appear as triangularly shaped lighted areas against an opaque background.

As shown in Fig. 18, the undersurface of guide plate 262 is very close to the upper surface of range bar 220; and the undersurface of guide plate 263 is similarly close to the upper surface of gun reticle bar 221 and to the upper surface of ammunition bar 222. Actually, a sliding contact exists between the guide plates and the bars. These guide plates, therefore, in addition to serving to contain, respectively, inserts 266 and 271, serve, in conjunction with base plate 226, to prevent the ammunition and the gun reticle bars from rotating as the respective lead screws 230 and 231 are rotated.

Scales-gun reticle unit 52 is attached to the side of collimator housing 150 near the midpoint thereof opposite scales transfer prism 175 so that the discrete images can be projected through an opening 203 in the side of collimator housing onto the transfer prism.

In order to illuminate the scales-gun reticle unit 52 for projecting and superimposing the discrete images upon the field of view of the binocular system, an electric bulb 281 (Fig. 33) is provided. This bulb is disposed in the same housing along with the electric bulb 211A for illuminating the right stereoscopic reticle pattern 169A and is connected electrically in parallel therewith. The lamp housing is emplaced in such manner that one bulb 211A is under the right stereoscopic reticle pattern and the other bulb 281 is under the scales. This latter bulb is positioned beneath an opening (not shown) in main housing 40 and beneath an opening (not shown) in base plate 226. When the bulb is illuminated, light rays emanating therefrom pass through a plate glass window 282 (Fig. 33), which is positioned between that bulb and the base plate, and then are projected through the discrete images of the scales-gun reticle unit. The same rheostat which controls illumination for the bulbs 211, 211A, associated with the stereoscopic reticle patterns also controls illumination of the bulb 281.

Two right angle prisms 223 and 224, and a reflecting mirror 225 (Figs. 11, 12 and 33) are provided for transmitting the discrete images emanating from the scales through the optical elements of the collimator. One prism 223 is disposed directly over the scales and the other prism 224 is disposed horizontally removed from the first and directly under the mirror 225.

Prism 223 has a full reflecting surface 275 (Figs. 12 and 33) and is disposed in the main housing 40 above the openings 242, 264 and 269 with the reflecting surface disposed at an angle of 45 degrees with respect to the paths of the light rays projected vertically upward through the discrete images. This prism is provided to reflect the scales images through a ninety degree angle horizontally toward the prism 224 under the mirror.

Righ angle prism 224 has a full reflecting surface 276 (Figs. 12 and 33) and is disposed with the reflecting surface substantially parallel to reflecting surface 275 (Figs. 12 and 33) so that it will reflect the scales images through a ninety degree angle vertically upward toward mirror 225.

Mirror 225 has a full reflecting surface 277 (Figs. 11, 12, 33 and 34) and is disposed to reflect the scales images through an angle of ninety degrees horizontally through an opening 283 (Fig. 19) in the wall of auto collimating housing 150; which is disposed opposite transfer prism 175, and then toward partial reflecting surface 176 of transfer prism 175. Therefore, when the scales-gun reticle unit is illuminated the light rays from the scales images are projected along a path indicated generally in Fig. 33 by the arrowed lines extending between the scales or bars 220, 221 and 222 and prisms 223 and 224, mirror 225 and transfer prism 175. From the transfer prism 175, the scales images are transmitted into the left or the right sighting system, as the case might be, along with the stereoscopic images originating in the collimator.

In order to provide for supporting mirror 225, that mirror is provided with coaxial trunnions 278 (Figs. 11, 12, 33 and 34) which are supported in a yoke, or like member (not shown), attached to collimator housing 150 (Fig. 11). Thus, mirror 225 is pivotally movable about the axis of the trunnions and relative to partial reflecting surface 176. Movement of the mirror is effected by means of a mechanical train of shafts and gears connected to an elevation bore sighting knob 320 mounted on a rotatable shaft 321 (Fig. 34) which is supported in convenient manner (not shown) in the instrument. The shafts and gears connecting this knob with the mirror 225 comprise a gear 322 mounted on shaft 321, the gears 323 and 324 mounted on a shaft 325, the gears 326 and 327 mounted on a shaft 328, the gear 329 and the cam 330 mounted on the shaft 331; the just-named shaft members being supported in convenient manner (not shown) in the instrument.

To aid in pivotally moving mirror 225 about the axis of its trunnions, an arm 279 (Figs. 11, 12, 33 and 34) is secured, in convenient manner (not shown), to one of the trunnions. Attached in usual manner (not shown) to this arm, near the free end thereof is a roller follower 280 (Fig. 34). This roller follower is constantly urged, as by a spring or like member (not shown), into rolling contact with a cam member so that, as the cam is rotated, the mirror is pivotally moved about the axis of its trunnions relative to partial reflecting surface 176. Therefore, it can be understood that rotation of bore sighting knob 320 causes rotation of cam 330 and resultant pivotal movement of mirror 225 about the axis of its trunnions 278. One purpose of having mirror 225 supported for pivotal movement relative to partial reflecting surface 176 is to facilitate vertically bore sighting the instrument to the armament with which it is intended to be used. Pivotal movement of mirror 225 raises or lowers the position of the images originating in the scales-gun reticle unit 52 and image 240i (Figs. 30, 31, 32) of gun reticle pattern 240 (Fig. 17) in particular, as seen in the binocular's field of view; thereby making it possible to bore sight the instrument, in elevation, to the armament.

Translation of the scales is effected through mechanical arrangements connected with the lead screws 230, 231 associated with the range and gun sighting reticle bars and the pinion gear 255 associated with the ammunition bar.

As can be understood from Fig. 34, rotation of lead screw 230 takes place through the agency of a mechanical train of shafts and gears connected to a range knob 290. The shafts and gears used herein comprise a gear 292 on a shaft 291, a gear 293 and a non-circular gear 294 on a shaft 295, a non-circular gear 296 and a gear 297 on a shaft 298, the gears 299 and 300 on a shaft 301, a gear 302 on a shaft 303, and a gear 304 on the lead screw; each of the just-named shaft members being supported in convenient manner (not shown) in the instrument. As indicated in the last-named figure, gear 292 meshes with gear 293, gear 294 with gear 296, gear 297 with gear 299, gear 300 with gear 302, and gear 302 with gear 304. Therefore, it can be understood that rotation of the range knob 290 causes rotation of lead screw 230 so that range bar 220 is moved or translated relative to base plate 226 (Fig. 17) and the range scale graduations 235 are moved or translated correspondingly relative to range reference mark 267.

Lead screw 231 (Figs. 17, 18 and 34) is rotated when the instrument is to be bore sighted, in azimuth, to the armament. Rotation of lead screw 231 causes sliding movement of gun reticle bar 221 on base plate 226 and attendant corresponding movement of gun reticle pattern 240.

Rotation of lead screw 231 takes place through the agency of a mechanical train of shafts and gears connected to an azimuth bore sighting knob 305 mounted on a rotatable shaft 306 (Fig. 34) which is supported in convenient manner (not shown) in the instrument. The shafts and gears connecting this knob with lead screw 231 comprise a gear 307 mounted on shaft 306, the gears 308 and 309 mounted on a shaft 310, the gears 311 and 312 mounted on a shaft 313, and a gear 314 mounted on lead screw 231; the shaft members being supported in convenient manner (not shown). As shown in Figure 34, gear 307 meshes with gear 308, gear 309 with gear 311 and gear 312 with gear 314. Therefore, it can be understood that rotation of azimuth boresight knob 305 causes rotation of lead screw 231 so that gun reticle bar 221 is moved relative to base plate 226 (Fig. 17) and so that gun reticle pattern 240 is moved correspondingly.

Ammunition bar 222 is translated or moved on base plate 226 by pinion gear 255 (Fig. 34). Rotation of this gear causes sliding movement of ammunition bar 222 on base plate 226 and attendant corresponding movement of ammunition markings 252 relative to ammunition reference mark 272.

Rotation of gear 255 takes place through the agency of a mechanical train of shafts and gears connected to an ammunition knob 315 mounted on a rotatable shaft 316 (Fig. 34), the latter being supported in convenient manner (not shown) in the instrument. The shafts and gears connecting this knob with pinion gear 255 comprise a gear 317 mounted on shaft 316, and a gear 318 mounted on shaft 256 along with pinion gear 255; each of the just-named shafts being supported in convenient manner (not shown) in the instrument. As shown in Figure 34, gear 317 meshes with gear 318 and pinion gear 255 meshes with rack 254 on ammunition bar 222. Therefore, it can be understood that rotation of ammunition knob 315 causes rotation of pinion gear 255 so that ammunition bar 222 is moved relative to base plate 226 (Fig. 17) and ammunition markings 252 are moved correspondingly relative to ammunition reference mark 272.

Ballistic gearing

It is well known that the required superelevation of the gun above the line of sight of a selected target is a function of various calculated ballistic factors. Of these factors, horizontal range of the target is the most important, the others including the type of ammunition selected and the ambient ballistic conditions present (muzzle velocity, air density, wind and atmospheric temperature). Corrections for superelevation are introduced by means of the present fire control instrument through the assistance of three independently operated adjustments, namely: (1) the adjustment which provides a measure for ambient ballistic conditions; (2) the adjustment which provides a measure for type of ammunition; and (3) the adjustment which provides a measure for range. These adjustments are mechanically introduced into the system and combined by utilizing a mechanical arrangement of gears and differential mechanisms, the net result thereof being employed both to move the instrument vertically and position it relative to the armament with which it is associated and to move the armament together with the instrument coupled therewith vertically to correct for superelevation.

Of the three adjustments, it is expedient for an operator to introduce that for correcting for ambient ballistic conditions first since the factors taken into consideration do not change as readily as the other two. Next, in the order of introducing adjustments, is that for type of ammunition selected as appropriate for firing and lastly that for range. Accordingly, the present instrument is designed to combine the adjustments for ambient ballistic conditions and type of ammunition selected by introducing these two corrections into a ballistic differential mechanism. The output of this differential along with the correction for range is then introduced simultaneously into two independent differential mechanisms namely, a superelevation differential mechanism and a superelevation take-off differential mechanism. The output of the superelevation differential is utilized to operate a ballistic cam arrangement to move the instrument relative to the armament with which it is associated. The output of the superelevation take-off differential is utilized to operate the armament elevating mechanism to adjust for superelevation according to the factors introduced.

The correction or adjustment for ambient ballistic conditions is introduced through a ballistic correction knob 400 which is mounted on a shaft 401 (Fig. 34) supported in convenient manner (not shown) in the instrument. The ballistic correction knob is located on the exterior of main housing 40 in a position convenient to an operator, for example, as shown in Figure 5. Rotation of ballistic knob 400 imparts movement to one (408) of the two input gears of a ballistic correction differential 389. The mechanical linkage connecting these parts is shown particularly in Figure 34 and comprises: the shaft 401; a gear 402 mounted on shaft 401; a gear 403 engaged with gear 402 and mounted on a shaft 404; the gears 405 and 406 mounted on a shaft 407, gear 405 being engaged with gear 403; and input gear 408 of ballistic correction differential 389 mounted on a shaft 409. The other input of ballistic correction differential 389 is controlled through the operation of ammunition correction knob 315. This knob is mounted on a shaft 316 (Fig. 34) supported in convenient manner (not shown) in the instrument and is located on the exterior of main housing 40 in a position convenient to an operator such as that shown in Figure 5. Rotation of ammunition knob 315, in addition to operating or imparting movement to the other one (386) of the two input gears of ballistic correction differential also effects translation of ammunition scale 250.

The mechanical linkage connecting ammunition correction knob 315 with ammunition scale 250 utilizes the majority of the linkage just described except that pinion gear 255 is mounted on the shaft 256 so that rotation of ammunition knob 315 causes simultaneous movement of input gear 386 and ammunition scale 250.

The output of ballistic correction differential 389 is a product of the combined factors introduced by way of the ambient ballistic condition knob 400 and the ammunition correction knob 315. The product of these factors is utilized as one of two factors introduced both into a superelevation differential mechanism 377 and into a superelevation take-off differential 360. This product is introduced by means of an output gear 388 of ballistic correction differential which effects movement simultaneously of one input gear 395 on shaft 396 of superelevation differential 377 and one input gear 393 on shaft 394 of superelevation take-off differential 360. The mechanical linkage employed to connect these gears is shown in Figure 34 and comprises gears 390 and 391 attached to opposite ends of a hollow shaft 392, the gear 390 being engaged with output gear 388 and the gear 391 being engaged with both input gears 395 and 393.

The second input factor introduced into the superelevation differential 377 and the superelevation take-off differential 360 is controlled by operation of range correction knob 290. Range correction knob imparts movement simultaneously three ways: (1) movement of both the other input gear 365 attached to shaft 366 of superelevation differential and the other input gear 344 attached to shaft 345 of superelevation take-off differential; (2) translation of range scale 220; and (3) effects adjustment of ranging lens 338 which is a component of optical compensator 339 located in the binocular right sighting system.

The mechanical linkage employed to connect range knob 290 with input gears 365 and 344 is shown in Figure 34 and comprises: the shaft 291 on one end of which range knob 290 is mounted, the range knob being located on the outside of main housing 40 in a position convenient to an operator; the gear 292 mounted on the opposite end of shaft 291; gears 293 and 340 mounted on the shaft 295, the gear 293 being engaged with gear 292; and the gears 341, 342 mounted on opposite ends of a shaft 343, the gear 341 being engaged with the gear 340 and the shaft extending concentrically through hollow shaft 392, with gear 342 engaged with both input gears 365, 344.

The mechanical linkage employed to connect range knob 290 with the lead screw 230 for translating range scale 234 was explained above with respect to translating the scales 220, 221, 222.

Optical compensator 339 (Figs. 9, 10, 14, 33 and 34) is that component which enables stereoscopic contact to be established with a selected target to make it possible to determine the distance from the instrument at which such contact is established; this distance being the range of that target. The use of optical compensator 339 to establish stereoscopic contact with the target selected and to determine range of that target is well known to those skilled in the art thereby precluding further explanation thereof.

The mechanical linkage employed to connect the range knob 290 with optical compensator 339 is also shown in Figure 34 and comprises: a gear 379 mounted on the shaft 301 on which gears 299, 300 are mounted; and a gear 380 mounted on a lead screw 381, the gear 380 being engaged with the gear 379 and the lead screw being mechanically coupled with the lug 462 attached to sliding holder 461.

Thus, the superelevation differential 377 and the superelevation take-off differential 360 each combine the motions from the ballistic correction differential 389 and the range knob 290. The output of the superelevation differential is connected through a mechanical linkage with superelevation and buffer cams 336, 337 used to position the instrument relative to the armament with which it is associated. The output of the superelevation take-off differential is connected through a mechanical linkage with a synchrotorque transmitter 335, the latter being connected with the armament elevating mechanism.

The mechanical linkage connecting the output of the superelevation differential 377 with the cams necessary to position the instrument relative to the armament is contained in a housing 415 (see Figs. 20, 21 and 22). The output of superelevation differential is transmitted by the output gear 367 on shaft 368 through the mechanical linkage comprising: a gear 369 mounted on a shaft 370, the gear 369 being engaged with output gear 367; the gears 371, 372 mounted on a shaft 373, with the gear 371 engaged with gear 369; and a gear 374 mounted on a shaft 375, with gear 374 engaged with gear 372. The superelevation cam 336 and the buffer cam 337 are also mounted on shaft 375 and are attached to the hub of gear 374. Shaft 375 is supported at opposite ends thereof by bearings 416 which are held in place by nuts 417 threadedly engaged with the shaft ends.

Cam housing 415 comprises the opposed, spaced walls 418 and 419 (Figs. 9, 10, 20 and 22) which are connected together by a third wall 420. The third wall is provided with an opening 456 and the main housing adjacent wall 110 is provided with a similar opening 455 through which the output gear 367 of superelevation differential extends to engage gear 369. A removable fourth wall 421 is secured to walls 418 and 419, as by the screws 422. The cam housing is attached beneath main housing 40 by screws 454 (Figs. 20 and 22), the main housing serving to close the top of the cam housing. The bottom of the cam housing is closed and sealed by a diaphragm 450 and a coupling member 434.

Inside cam housing 415 are the arcuate guide strips 423 and 424 (Figs. 20 and 22) of substantially equal curvature. Guide strip 423 is secured, as by screws 425, to the cam housing wall 418 with the guide strip concave surface facing the cam housing wall 420 (Fig. 21); and guide strip 424 is similarly secured, as by screws 426 (Fig. 20), to the cam housing wall 420 in opposed, spaced parallel relation, as viewed in Figs. 20 and 22, to guide strip 423.

As shown in Fig. 22, the right surface of guide strip 423 is provided with a V-shaped groove 427. This groove extends the arcuate length of that guide strip and is concentric with the curvature thereof. Similarly, the left surface of guide strip 424 is provided with a V-shaped groove 428 (Fig. 22).

Between guide strips 423 and 424 is an arcuate slide 429 (Figs. 20 through 22), the radius of curvature of which is substantially identical to that of the guide strips. As shown in Fig. 22, the left and the right surfaces of slide 429 are each provided with a V-shaped groove 430 (also see Fig. 21); each V-groove extending the arcuate length of the slide in a path concentric to that slide's radius of curvature.

Disposed between the right surface of guide strip 423 and the left surface of slide 429, as viewed in Figs. 20 and 22, and similarly disposed between the right surface of slide 429 and guide strip 424, in juxtaposed V-grooves 427 and 430 (Fig. 22) and in juxtaposed V-grooves 430 and 428, is a plurality of ball bearings 431. The ball bearings are accommodated in an arcuate retaining strip 432 (Figs. 20, 21 and 22) which is prevented from coming out of position between the guide strips and the slide by any convenient means (not shown). Thus, guide strips 423 and 424 are movable, in an arcuate path, as viewed in Fig. 21, relative to slide 429; and, conversely, the slide is movable, in the same path, relative to the guide strips. Furthermore, the guide strips 423 and 424 and the arcuate slide 429 are disposed concentric with the pillow block bearings 43 when the cam housing is mounted on the main housing.

Secured to slide 429, as by the screws 433, is the coupling member 434 (Figs. 1 through 3, 5, 6 and 20 through 22) for mechanically connecting the armament elevating mechanism with the superelevation and buffer cams 336, 337. Coupling member 434 comprises a rather flat base portion 435 (Figs. 1 through 3, 5, 6 and 20 through 22) and an upright portion 436 which projects from the base portion and is secured to slide 429.

As shown in Figs. 1, 2, 5, 6, 20 and 21, the coupling member base portion 435 is somewhat outside the open bottom of cam housing 415; and, as shown in Figs. 20 through 22, the coupling member upright portion 436 extends into the cam housing through the bottom thereof for attachment to slide 429. The coupling member, by virtue of this attachment to the slide, becomes capable of movement in an arcuate path, as viewed in Fig. 21, relative to the cam housing; and, conversely, the cam housing is capable of arcuate movement relative to the coupling member.

Positioned on the coupling member base portion 435, with its axis parallel to shaft 375, is a wrist pin 437 (Figs. 1 through 3, 5, 6 and 20 through 22). This pin, with each end extending somewhat beyond the base portion, is secured in place by means of a cap 438 (Figs. 20 through 22), the latter being attached to the coupling member base portion by means of the screws 439 (Figs. 20 and 22).

Upright portion 436 of coupling member 434 carries the roller followers 440 and 441 (Figs. 20 and 21). The one follower 440, which is supported for rotation on a shoulder screw 442 (Fig. 21), is in rolling contact with superelevation cam 336, the shoulder screw being attached to the upright portion in any convenient manner; and the other follower 441, which is supported for rotation on a similar shoulder screw 444 (Fig. 21), is in rolling contact with buffer cam 337. Shoulder screw 444 is mounted on an arm 443 (also see Figs. 20 and 22) which is attached for pivotal movement to upright portion 436, as by a pin or like member 445 (Fig. 21).

Positioned between the coupling member base portion 435 and arm 443 is a coil spring 446 (Fig. 21). This spring serves constantly to urge the arm toward buffer cam 337 so that roller follower 441 on that arm is held in rolling contact with the buffer cam (also see Fig. 20) and so that roller follower 440 is held in rolling contact with superelevation cam 336 (also see Fig. 20).

Also serving to maintain rolling contact between roller followers 440 and 441 and the respective cams 336 and 337 and additionally serving to prevent arm 443 from moving away from buffer cam 337 is an adjusting screw 447 (Figs. 20 and 21). As shown in the last-named figure, this screw threads into arm 443 and one end of that screw abuts the coupling member base portion 435. The free end of arm 443 is cleft and is provided with a lock screw 448 to prevent screw 447 from rotating in the arm.

In order to close the bottom of cam housing 415 and to seal the space between the coupling member base portion 435 and that cam housing, there is provided the tubular, accordion-like diaphragm 450 (Figs. 20 through 22). One end of this diaphragm is pressed into sealing contact with the coupling member base portion 435 by a clamp ring 451 (Figs. 21 and 22) which is secured to the base portion by screws 452; and the other end of the diaphragm is similarly pressed into sealing contact with the bottom of the cam housing by means of a clamp ring 453 (Figs. 20 and 21) secured to the cam housing by other screws (not shown). Coupling member 434 is provided with a level vial 560 (Figs. 3, 20 and 22) for the purpose of indicating a level condition of the armament.

From Fig. 21, it can be understood that, when coupling member 434 is in a fixed position and superelevation and buffer cams 336 and 337, respectively, are rotated, main housing 40 and cam housing 415 attached thereto will move in an arcuate direction, concentric with the curvature of guide strip 423 and relative to the coupling member. Conversely, when the main housing and the attached cam housing are in a fixed position and the cams are rotated, the coupling member will move in an arcuate path concentric with the curvature of slide 429 and relative to the main housing and the cam housing attached thereto. Additionally, with the cams stationary, a force can be exerted on the coupling member to cause pivotal movement of main housing 40 relative to its pillow blocks 42.

Superelevation and buffer cams 336 and 337, respectively, are secured to the hub of gear 374 with the cams in side by side relation with each other. Therefore, when gear 374 is rotated, the superelevation and the buffer cams rotate simultaneously therewith about the gear's axis.

As indicated in Fig. 21, the respective contours of superelevation and buffer cams 336 and 337 are placed in opposed operating relation to each other. Because of this, the buffer cam, aided by roller follower 441 in rolling contact therewith, serves constantly to prevent unwanted play between the superelevation cam and roller follower 440 in rolling contact therewith.

Synchro-torque transmitter 335 (Fig. 34) is an electromechanical device which is mounted in convenient manner (not shown) in main housing 40 (Figs. 1, 2, 5, 9 and 10). It is of conventional type and well known to those skilled in the art. For that reason, the principles of operation and the details of construction and operation will not be explained. It will suffice to explain that this device operates by rotation of a rotor 358 (Fig. 34) which converts the movement into an electrical output; the amount and the polarity of such output depending upon the amount and the direction of the rotor's rotation. Movement of the rotor is imparted through output gear 346 attached to shaft 347 of superelevation take-off differential 360 and the mechanical linkage connecting that output gear with the rotor. The mechanical linkage, in this case, comprises: a pair of gears 348, 349 mounted on a shaft 350, the gear 348 being engaged with output gear 346; a gear 351 and a non-circular gear 352 mounted on a shaft 353, the gear 351 being engaged with gear 349; a non-circular gear 354 and a gear 355 mounted on a shaft 356, the gear 354 being engaged with gear 352; and an input gear 357 mounted on the shaft of rotor 358 and engaged with gear 355.

*Ancillary components*

Fire control for armament may be considered to comprise either a fire control instrument of the kind described above or a secondary fire control system, or a combination of both. The system herein shown and described is concerned with a combination of the two installed for use in an armored vehicle to rapidly and accurately aim the vehicle's armament. It is assumed that the present fire control instrument is to be preferred for use as a primary system to orient the armament with a selected target and that the secondary equipment or system is to be used when the primary equipment or system fails to operate.

The armored vehicle, in this case, comprises a body or a hull 525 upon which the turret 526 is mounted for unlimited rotation in a clockwise or in a counterclockwise direction relative to the hull. The vehicle's main armament comprises a large gun 527 (Figs. 1, 2, 5 and 6) of artillery caliber (e. g. 90 mm.), and a small gun 528 (Figs. 1, 5 and 6) of smaller caliber (e. g., a 50 cal. machine gun), both of which guns are assumed to have been bore sighted to the same reference point in order that they may be operated in parallel.

Large gun 527 comprises a breech 529 (Figs. 1, 2, 5, 6 and 8 through 8B), a barrel 530 (Figs. 1, 2, 6 and 8 through 8B), and the coaxial left and right trunnions 531 (Figs. 2 and 5) supported in bearings 532. The axis of the trunnions is disposed horizontal and perpendicular to the axis of barrel 530 so that the gun 527 is pivotally movable in a vertical plane for adjusting the angle of elevation thereof. Inasmuch as this gun mounted on turret 526, as the turret is rotated relative to hull 525 to adjust for azimuth, the position of the gun is also changed azimuthally.

Small gun 528 comprises a breech 533 (Figs. 1, 5 and 6) and a barrel 534 (Figs. 1 and 6). This gun, with its muzzle (not shown) facing in the same direction as that of gun 527, is mounted on a cradle 535 (Figs. 5 and 6) and is secured to one side of large gun 527 for simultaneous adjustment therewith both in azimuth and in elevation as well as being adjustable on the cradle, so that gun 528 can be bore sighted to the same reference point as gun 527.

In order to rotate the turret 526 (Fig. 5) relative to the hull 525, thereby to change the position of the main armament in azimuth and simultaneously to change the position of the coplanar lines of sight from the fire control instrument end housings 55 by the same amount and in the same direction, the vehicle is equipped with suitable rotating mechanism 545 (Fig. 5). This mechanism is provided with an azimuth indicator 546 of a suitable type on which the rotative position of the turret relative to the hull is indicated, such indication applying also to the main armament and to the fire control instruments in the turret.

Azimuth rotating mechanism 545 is secured in turret 526 so that a pinion gear 547 (represented in Fig. 5), which is a part thereof, is enmeshed with a fixed ring gear 548 mounted on the hull 525. When the pinion gear is rotated relative to fixed ring gear, rotation of the turret relative to its hull is effected. Rotation of pinion gear is effected either by manually rotating a crank 549 (Fig. 5) or by operation of a conventional type power driven mechanism both of which rotating means are operatively connected to the pinion gear.

The power driven mechanism is represented in simplified form and in light lines in Fig. 8. The components shown and comprising this mechanism are an electric motor 537, a hydraulic pump 550 driven by that motor and the control handles 542. The control handles 542 are so located in turret 526 as to be within easy reach of the vehicle crewman who is to use them.

In order to pivotally move gun 527 about the axis of its trunnions 531 and 531A, thereby to change the main armament's angle of elevation and simultaneously to change the angle of elevation of the copolanar lines of sight from the instrument end housings by the same amount and in the same direction, the equipment includes a power driven mechanism. In addition, a manual operating mechanism may also be provided and is contemplated as part of the present system. Both of these mechanisms are operatively connected to large gun 527 in such manner that operation of either mechanism effects elevation or depression of the gun under control of an operator. In the case of the manually operable mechanism, operation is controlled by rotating a crank 536 (Fig. 5) which forms a part of that mechanism. With reference to the power driven mechanism, however, operation is made responsive to the operation of the above-described fire control instrument so that the main armament can be pivotally moved automatically about the axis of its trunnions.

Only portions of the power driven elevating mechanism are represented which are sufficient to lead to an understanding as to use and operation. These are shown in simplified form and in thin lines in Fig. 8. The components comprise the electric motor 537, a hydraulic pump 538 driven by the motor, a valve 539 connected in known fashion to the pump and an elevating cylinder 540 connected to the valve and to large gun 527. Operation of the power driven mechanism may also be imparted manually through operation of either one of the control handles 543, 549.

The operation of valve 539 and the operation of the power driven mechanism for pivotally moving gun 527 about the axis of its trunnions are made automatically responsive to the operation of the fire control instrument as well as to manual operation or by operation of the power driven mechanism independently of other controlling means.

In order to make the operation of valve 539 and the power driven mechanism associated therewith responsive to operation of the instrument, a synchro-torque receiver 541 (Fig. 8) is provided. Synchrotorque receiver 541, like synchro-troque transmitter 335, is an electro-mechanical device which is connected to the synchro-torque transmitter 335 (Fig. 34) by the conductor 566 (Fig. 8) contained in flexible conduit 564 and the multipronged plugs 565. Thus, operation of the synchro-torque transmitter, in consequence of operation of the fire control instrument, produces an electrical output which is received by and operates the synchro-torque receiver. The synchro-torque receiver, in turn, operates the valve to control the flow of hydraulic fluid to or from elevating cylinder 540 (Fig. 8). Thus, the elevating cylinder positions the gun in elevation or depression in accordance with corrections for superelevation transmitted from the fire control instrument.

A mechanical linkage or coupling is also provided between the present fire control instrument and the armament the function of which is to assure that the line of sight of the instrument will reproduce the exact motion of the armament in elevation. This mechanical coupling comprises a trunnion arm 561 and a link 562 (Figs. 2, 5, and 6). One end of the arm is secured to gun trunnion 531 and one end of the link is secured to the wrist pin 437 of the coupling 434 associated with the superelevation and buffer cams 336, 337 for simultaneous pivotal movement with the wrist pin. The free ends of the arm and the link are pivotally connected as by a pin 563 (Fig. 6).

From Fig. 6, it can be understood that arm 561 and link 562 complete a parallelogram relation between the instrument and gun 527. This relation exists because the length of arm 561 (i. e., the distance between the axis of trunnion 531 and the axis of pin 563) is identical to and the arm is parallel to an imaginary line extending between the pivotal axis of the instrument pillow blocks 42 and the axis of the instrument wrist pin 437. Also because the length of link 562 (i. e., the distance between the axis of pin 563 and the axis of wrist pin 437) is equal to and the link is parallel to an imaginary line extending between the axis of trunnion 531 and the pivotal axis of pillow blocks 42.

With the instrument mechanically coupled to large gun 527, it will be evident from Fig. 6 also that, when the gun is rotated about the axis of its trunnions 531, main housing 40, through the agency of the mechanical coupling, is simultaneously rotated in the same direction relative to its pillow blocks 42.

Once the fire control instrument is mechanically coupled to the main armament, the instrument and the armament are bore-sighted to a common reference point. This may be accomplished by any suitable procedure well known in the art and, therefore, it will not be described herein. However, it suffices to mention that, to facilitate bore sighting, the following reference marks are provided: reference mark 567 is provided on main housing 40 and disposed adjacent to ballistic correction knob 400; reference mark 570 is provided on main housing 40 and disposed adjacent to gun laying sighting correction knob 305; reference mark 571 is provided on main housing 40 and disposed adjacent to elevation bore sighting knob 320; and reference mark 575 is provided on main housing 40 and disposed adjacent to ammunition correction knob 315. Upon bore sighting the armament and the fire control instrument to a common reference point, these reference marks are used to set the respective correction knobs together with related scales to proper alignment one with the other and thereby have all factors coordinated.

Minor orientation adjustments may be compensated for by shifting the position of image 240i of the gun reticle pattern either horizontally or vertically merely by releasing either one or both of the clamp levers 568, 569 and entering the necessary correction by means of the azimuth or elevation bore sighting knobs 305, 320 and then resetting the clamp levers.

Once the fire control instrument and the armament are oriented and ready for operation, firing of the armament is effected at the will of an operator through use of either the firing buttons 573 located on handles 542 or a firing button 574 located on crank 536 (see Fig. 5), or a firing button 617 located on the elevation control handle 543.

With the instrument installed in the turret of an armored vehicle, the ends of the first control instrument will be exposed on opposite sides thereof. In order to adequately protect these instrument ends from damage as much as possible, hoods 558 are provided to cover the exposed ends. These hoods have elongated openings (not shown) disposed in front of the end windows of the fire control instrument through which the binocular sighting systems are exposed to the field of view.

Secondary fire control system

The secondary fire control system is intended primarily for use when the fire control instrument of the primary system fails to operate. In general, the armament is intended for use in firing against fixed or moving targets from the armored vehicle which is in a stationary position. Tracking the target and firing of the weapons is normally done by a gunner operating the primary fire control instrument and who is occasionally assisted by a commander having overriding controls at his command and who can assist the gunner during operation of the secondary fire control system.

The components which comprise the secondary fire control system are a ballistic drive 581 (Figs. 2, 5 and 6), a gunner or turret periscope 580 (Figs. 2, 5 and 6), a commander or cupola periscope 583 (Figs. 2, 5 and 6) and an elevation quadrant 582 (Figs. 2 and 3).

The ballistic drive unit 581 of the secondary system functions as the driving unit between the gun trunnions and the two periscopes and introduces estimated corrections for superelevation into mechanism controlling the lines of sight from the periscopes to compensate for the effect of gravity on the projectile. The unit is arranged to rotate in bearings (not shown) about a drive shaft 590 the axis of which is disposed perpendicular to the gun tubes 530, 534. The drive shaft 590 is supported from the turret roof by bearings 593 which are disposed to the left of the ballistic drive unit and behind the large gun trunnions 531.

The unit is mechanically coupled with the gunner and commander periscopes which are designed with a movable head mirror for vertical scanning and sighting purposes. Three parallelogram linkages are utilized, two between the gun trunnions and the ballistic drive unit 581 of the secondary fire control system units and a third between the commander periscope and the base of the ballistic drive unit 581. These linkages assure that the lines of sight of the periscopes will reproduce the exact motion of the armament in elevation or depression, movement of the armament being accomplished with the aid of either power or manually operated mechanisms.

The parallelogram linkages between the gun trunnions and the ballistic drive unit of the secondary fire control system consists of a first, previously described, parallelogram linkage comprising the arm 561 and the link 562 which connect the large gun trunnions 531 with the coupling 434 of the fire control instrument of the primary system and a second parallelogram linkage comprising the links 591, 592 which connect the coupling 434 with the left end of drive shaft 590. One end of link 591 is keyed to the left end of drive shaft 590 (i. e., the left end of the drive shaft, as shown in Fig. 5) so that it is movable therewith and the other end thereof is connected to an end of link 592 by a pivot pin 596. The other end of link 592 is connected to the coupling wrist pin 437.

From Fig. 6, it is understandable that the links 591, 592 are disposed in a parallelogram relation by reason of the effective length of link 591 (i. e., the distance between the axis of drive shaft 590 and the axis of pivot pin 596) being equal in length and the link being disposed parallel to an imaginary line extending between the axis of pillow block 42 and the axis of wrist pin 437. Also, because the effective length of the link 592 (i. e., the distance between the axis of wrist pin 437 and the axis of pivot pin 596) is equal in length and the link is disposed parallel to an imaginary line extending between the axis of the pillow blocks 42 and the axis of drive shaft 590. Thus, pivotal movement of the large gun 527 about the axis of its trunnions imparts corresponding pivotal movement of drive shaft 590.

The third parallelogram linkage, that is, the one between the commander periscope 583 and the base assembly of the ballistic drive unit 581 comprises the links 620, 621. One end of link 620 is connected to the left end of drive shaft 619 (Fig. 5) associated with the commander periscope 583 and is keyed thereto so as to move in unison therewith. The other end of link 620 is connected by a pivot pin 625 to an end of link 621. The other end of link 621 is pivotally attached to a pin 626 which is secured to and extends laterally from the base of ballistic drive unit 581.

From Fig. 6, it is understandable that links 620, 621 are disposed in a parallelogram relation by reason of the effective length of link 620 (i. e., the distance between the axis of drive shaft 619 and the axis of pivot pin 625) being equal to and the link being disposed parallel to an imaginary line extending between the axis of drive shaft 590 and the axis of the ballistic drive unit base pin 626. Also, because the effective length of link 621 (i. e., the distance between the axis of pivot pin 625 and the axis of base pin 626) is equal in length and is disposed parallel to an imaginary line extending between the axes of drive shafts 590, 619. Thus, pivotal movement of the ballistic drive unit 581 about the axis of drive shaft 590 imparts corresponding pivotal movement of drive shaft 619 to alter the line of sight from commander periscope 583 in a vertical plane.

The ballistic drive unit 581 is a mechanism by means of which estimated corrections for superelevation may be introduced for properly orienting the armament in a vertical plane. The unit includes a rotatable range scale (not shown), a transparent window 600, a movable frame 601, a rotatable range knob 602 and a level vial 603. The level vial is useful at the time of installing the unit and in orienting the unit with other related equipment. The rotatable range scale is visible through the window 600 and comprises a plurality of scales each of which is graduated according to range for each type of ammunition intended for use with the armament. The movable frame 601 is for convenience in indexing the particular scale selected according to the type of ammunition chosen for firing at a target. The range scale is mechanically coupled with the range knob 602 and with a differential gear mechanism (not shown) connecting the range knob and unit with the drive shaft 590 the gear mechanism being disposed internally of the unit.

Since the ballistic drive unit is arranged rotatable relative to drive shaft 590 and since it takes a great deal of power to move the armament on the trunnions, as the range knob 602 is rotated, it necessitates movement of the unit and, at the same time, rotates the range scale rather than moves the armament. Thus, this type of arrangement permits superelevation for estimated range and for type of ammunition to be introduced into the system first by rotating the ballistic drive unit together with the mirrors of the commander and gunner periscopes and next, by elevating or depressing the gun by the manual or power controls until the line of sight from the mirrors is brought back to its original position on target as a result of the parallel movement linkage between those mirrors and the gun trunnions.

Gunner or turret periscope

Those parts of the gunner or turret periscope 580 which are represented in the drawings (Fig. 5) comprise: the window 584; the monocular eyepiece 585, the optical system of which contains a sighting reticle (not shown, but similar to gun reticle pattern 240 shown in Fig. 17) and a diopter adjustment (not shown); the azimuth and the elevation bore sighting knobs 586 and 587; the rotatable elevation sweep shaft 588; and the gun ready light 589.

Turret periscope 580 is a monocular sighting device for inspecting and scanning the space outside the vehicle using either the window 584 or the eyepiece 585.

As shown in Fig. 6, most of turret periscope 580 is positioned inside the vehicle turret 526 and a small portion thereof extends above the turret roof to facilitate the line of sight 599 of this periscope. As shown in Fig. 5, the periscope window 584 is located just above the fire control instrument eyepieces 140 and the periscope monocular eyepiece 585 is located just to the right of the right instrument eyepiece 140A. This arrangement facilitates use of either the instrument eyepieces or the periscope window 584, or the periscope monocular eyepiece 585.

Inasmuch as turret periscope 580 is mounted in the vehicle turret 526, the line of sight 599 from that periscope is changed azimuthly as the turret is rotated. Correction in a vertical plane is effected by rotating a reflector (not shown) in turret periscope 580. The reflector is operated by an elevation sweep shaft 588 which extends laterally from the periscope housing. The sweep shaft 588 is connected with the ballistic drive unit 581 through a special type of coupling 594 and a drive shaft 597.

That portion of the coupling which is secured to the elevation sweep shaft is provided with an arm 595 (Fig. 5). This coupling is so constructed and arranged that any rotation of shaft portion 597 is transmitted unchanged in amount and direction directly to elevation sweep shaft 588. However, rotation of the elevation sweep shaft independently of other units may be effected through the coupling 594 with the agency of arm 595. The arrangement provides for the arm to be spring biased so that the sweep shaft will be engaged with the drive shaft 597 whenever the arm is not in use. The drive shaft 597 has one end thereof attached to the other portion of the coupling and the other end thereof secured to the right side of the ballistic drive unit 581. The shaft is supported between the ends thereof by a bearing 598 attached to the roof of the turret. Thus, as the ballistic drive unit rotates about the drive shaft 590, the drive shaft 597 will rotate with the unit. Therefore, since the sweep shaft 588 is rotated by either the drive shaft 597 or the arm 595, the angle of elevation of the line of sight from periscope 580 is changed accordingly.

Once installed, turret periscope 580 is oriented on the same reference point as that to which the main armament and the present fire control instrument are bore sighted. This is accomplished by rotating the azimuth and elevation bore sighting knobs 586 and 587, respectively (Fig. 5), of the turret periscope, as required.

Gun ready light 589 (Fig. 5) is used to signal when the main armament is loaded and ready to be fired. The armament is usually prepared for firing (i. e., loaded and unloaded as needed) by a vehicle crewman known as the gun loader. When the armament is ready to be fired, the gun loader pushes a button (not shown) to illuminate the gun ready light thereby indicating that the armament is prepared and ready for firing.

Commander or cupola periscope

Commander periscope 583 is substantially identical in construction and operation to the gunner periscope 580 and is intended to be used by a person other than the person using the present fire control instrument described above, usually the crew commander.

Those parts of the commander or cupola periscope 583 which are represented in the drawings (Fig. 5) comprise: the window 610; the monocular eyepiece 611, the optical system of which contains a sighting reticle (not shown, but similar to gun reticle 240 shown in Fig. 17) and a diopter adjustment (not shown); the elevation sweep shaft 612; the azimuth and the elevation bore sighting knobs 613 and 614, respectively; and the gun ready light 615.

As shown in Figs. 5 and 6, this periscope is disposed mostly inside the cupola 616 and is positioned somewhat above and behind turret periscope 580. Also, an upper portion of cupola periscope 583 extends through an opening 618 in the cupola roof to expose the optical elements to the field of view forwardly of the vehicle. In Fig. 6, a portion of the line of sight from cupola periscope 583 is represented by the arrow 630, and the eye of an observer using the commander periscope identified by reference character 631.

Inasmuch as cupola periscope 583 is located in the vehicle turret 526, when that turret is rotated azimuthally relative to the vehicle hull, the line of sight 630 from that periscope is changed in azimuth along with the coplanar lines of sight from the fire control instrument and the line of sight 599 from turret periscope 580.

Cupola periscope 583 is mechanically coupled directly to ballistic drive 581 by the parallelogram linkage comprising the links 620, 621, the drive shaft 619, the coupling 623 and the elevation sweep shaft 612 which is connected with a rotatable reflector (not shown). Thus, whenever the ballistic drive is moved about the axis of drive shaft 590, the angle of elevation of the line of sight 630 from the cupola periscope reflector is changed by the same amount and in the same direction along with the angle of elevation of the line of sight 599 from turret periscope 580.

The elevation sweep shaft 612 (Fig. 5) extends laterally from the periscope left side and is in axial alignment with drive shaft 619. The drive shaft 619 is supported for rotation by bearings 622 (Figs. 2, 5 and 6) which are attached to the inner surface of the roof of cupola 616 and the drive shaft is disposed parallel and coplanar to drive shaft 590 associated with the ballistic drive unit.

The coupling 623 is interposed between the left end of elevation sweep shaft 612 and the right end of drive shaft 619 (Fig. 5) and is similar to the coupling 594 associated with the gunner periscope 580. That portion of the coupling attached to the sweep shaft is provided with an arm 624 the function of which is to elevate the line of sight of the commander periscope independently of the ballistic drive unit.

Once installed, the cupola periscope 583 is bore sighted to the same reference point as that to which the main armament, the present fire control instrument and turret periscope 580 are bore sighted. The bore sighting of cupola periscope 583 is effected by rotating the azimuth and elevation bore sighting knobs 613 and 614, respectively (Fig. 5).

Elevation quadrant

The purpose of elevation quadrant 582 is to provide a means which is operated in conjunction with the secondary fire control system for laying the armament in elevation primarily during indirect firing conditions. The parts of elevation quadrant 582 which are shown in the drawings (Fig. 5) comprise: the body 605; the cover plate 606; the elevation vernier knob 607; the cylindrical level vial 608; and the reflector 609.

Elevation quadrant 582 is attached to the right side of ballistic drive 581 (Fig. 5) so that the cover plate 606 is rotatable in a vertical plane parallel to vertical movement of the armament as well as the lines of sight from the present fire control instrument and those from the periscopes. The cylindrical level vial 608 on the cover plate is also disposed from movement in a vertical plane. The level is also disposed in such manner that, when the main armament has zero elevation, it will indicate a level condition when the quadrant is set at zero. Thus, elevation quadrant 582 (Figs. 2 and 5) is a device which may be used to determine the angle of elevation of the armament relative to an imaginary horizontal plane, or it may be used to set the armament at any given angle of elevation relative to such imaginary horizontal plane, as in preparation for and during indirect firing (i. e., firing against a target which is not visible from the vehicle because of some obstruction to vision). In either case, the quadrant is controlled and adjusted by rotating the vernier knob 607 to a position where the level 608 indicates a zero or level condition. A scale (not shown) provided in conjunction with the knob will then indicate the amount of elevation or depression of the armament from the horizontal plane.

Operation

As stated above, the present invention contemplates a primary and a secondary system for controlling the fire of armament installed in an armored vehicle. In describing the operation of the equipment associated with both of these systems, it will be assumed that the fire control instrument of the primary system, all armament and both periscopes of the secondary system have been bore sighted to the same reference point and the objective members and eye members respectively of the fire control instrument and each periscope are horizontally aligned in vertical planes parallel with the bore axes of the guns. In addition, the vehicle is assumed to be fired against fixed or moving targets from an emplacement where it is disposed stationary and substantially in a horizontal position.

Usually, the fire control instrument is operated by a gunner who indexes the proper ammunition, sets in ballistic corrections, ranges, tracks the target and fires the weapons. The secondary fire control system is intended primarily for use in cases where the fire control apparatus of the primary system fails to operate. The mechanical linkage coupling the two systems is such that the periscopes of the secondary system may be used independently of or in conjunction with the fire control instrument of the primary system in cooperation with the gunner.

The present fire control system will be considered primarily from the viewpoint that the fire control instrument is fully operative and conditioned for transmitting electrically superelevation data to the armament elevating mechanism so that, when in operation, the armament will be positioned automatically. A suggested procedure for operating the present fire control instrument follows.

Normally, the armored vehicle is conditioned ahead of time at the base from which it operates for a particular mission. It is to be understood, however, that the anticipated field conditions might change and that the procedure to be described may have to be varied according to the conditions encountered. In conditioning the instrument for use, the gunner will make certain that the fire control instrument is properly adjusted to suit his eyesight. Corrections for ballistic conditions for that day, namely, muzzle velocity, air density, air temperature, wind, etc. which are not likely to change appreciably may be set in at this time.

The scale and reticle lights 281, 211 are turned on through operation of the knob 215 controlling the multiple contact switch. The desired brightness of the discrete images is adjusted through operation of the knob 216 controlling the rheostat. If necessary to obtain better contrast between the target image and the reticles and scales, the filters 506 are disposed in the optical path of the binocular optical system through operation of filter lever 515.

In order to introduce corrections for ambient ballistic conditions and for type of ammunition to be fired, the gunner operates, respectively, the ballistic correction knob 400 and the ammunition correction knob 315. Movement of both these knobs is transmitted to the ballistic correction differential mechanism 389 the output of which is fed simultaneously into the superelevation differential mechanism 377 and the superelevation take-off differential 360. Movement of the ammunition knob also indexes the type of ammunition on scale insert 250 so that the discrete image representative of that type of ammunition will be superimposed upon the field of view as seen in the binocular. For example, the image AP shown in Fig. 32.

The fire control instrument is normally operated with the scale transfer prism 175 positioned to reflect the scales only into the left optical path of the binocular system. However, because of the congruence of the images seen in the separate fields of view of both the left and right optical paths, the scales are made to appear as though superposed on both fields of view.

The input to the superelevation differential mechanism 377 being, therefore, under the influence of the corrections introduced for ambient ballistic conditions and for type of ammunition to be fired, movement of the superelevation cams 336, 337 responds accordingly. Rotation of the superelevation cams causes the main housing 40, together with the components therein, to rotate on its axis in bearings 43 carried by the pillow blocks 42 thereby raising or lowering the lines of sight 53 relative to the armament and the vehicle.

Operating in parallel with the superelevation differential 377 is superelevation take-off differential 360. The output of superelevation take-off differential is utilized to position a pair of non-circular gears 352, 354 which, in turn, operate a synchro-torque transmitter 335. In general, the electrical signal output from the synchrotorque transmitter is received by the synchro-torque receiver 541 to actuate and control the valve 539 of the hydraulic drive mechanism which positions the gun in elevation or depression. Although it would have been possible to utilize the lift of the superelevation cams 336, 337 to effect operation of the hydraulic drive mechanism, the use of the synchro-torque converters is simpler and affords greater stability.

Once the fire control instrument is adjusted for these relatively unchangeable factors affecting superelevation, the next consideration is the selection of a target. This is accomplished in the field by traversing the vehicle turret 526 in azimuth and by elevating or depressing the optical elements carried by the turret.

Traversing in azimuth is normally accomplished by the gunner who operates the rotating mechanism 545 either by power mechanism controlled by the handles 542 or by manually rotating the crank 549. Movement of the optical components in a vertical plane may be accomplished either by the gunner operating the fire control instrument through the use of power elevating mechanism controlled by the handle 549 or by the commander operating the power mechanism controlled by the handle 543. In addition, movement in the vertical plane may also be effected by the gunner manually rotating the crank 536. Since a parallelogram linkage (trunnion arm 561 and link 562) is provided between the armament and the fire control instrument and two other parallelogram linkages (links 591, 592 and 620, 621) are provided between the fire control instrument and the periscopes 580, 583, any movement of the lines of sight 53 from the fire control instrument in a vertical plane will be reproduced exactly by the armament and the periscopes. Likewise, introducing corrections for superelevation into the fire control instrument will also affect the instruments of the secondary system because of the parallelogram linkages between the two systems.

Once a target is selected, the gunner manipulates the armament elevation and azimuth controls to index the target directly under the vertex of the V image 164 formed by the stereoscopic reticle patterns 169i, 169Ai, in the manner illustrated by rectangle 572i in Figs. 28 and 29. The range knob 290 is then turned until the vertex of the V image appears to be in stereoscopic contact with the target. Rotation of the range knob imparts movement to the range bar 220 to superimpose a discrete image upon the field of view in the binocular in accordance with the range established by stereoscopic contact by the observer. In addition, movement of the range knob introduces an input simultaneously into the superelevation differential mechanism 377 and the superelevation take-off differential 360. In the same manner stated above with respect to moving the ambient ballistic correction knob 400 and the ammunition knob 315, the output of superelevation differential positions the fire control instrument relative to the armament and the output of superelevation take-off differential corrects for superelevation of the armament for firing at the target. In other words, movement of the range knob automatically elevates or depresses the armament while the range scale indicates the range on the field of view of the binocular. Except for automatic correction of the armament in elevation by the output of superelevation take-off differential, the fire control instrument would only be corrected for superelevation relative to the armament. In such case, it would then be necessary, either through independent operation of the power elevating mechanism or manually, to elevate or depress the armament until the target is brought again into the field of view in the binocular and properly indexed with reference to the gun laying reticle image 240i which has been previously bore sighted to a common reference point as that to which the gun has been bore sighted.

The fire control system anticipates that corrections for superelevation should be introduced in the manner described above for the major caliber gun 527 since their magnitude will not seriously affect the smaller caliber gun 528. Therefore, if the small caliber gun is to be used, the only further correction necessary is to change the correction for type of ammunition.

Apart from necessary lead to be applied, the armament is now ready for firing at the will of the gunner, firing being effected by means of the buttons 573, 574, or 617.

In the event that an end window 62 of the fire control instrument is shot out and part of the optical components are damaged, means are provided to permit either side of the binocular optical system to be used as an offset telescope. In such case, the range will then be estimated and set into the fire control instrument. If the left side of the instrument is damaged, the scales normally appearing in the left eyepiece 140 are transferred to the right eyepiece 140A by rotating the scale transfer prism 175 to reflect the images of the scales accordingly.

If, however, the fire control instrument of the primary system is damaged beyond repair or use on the field of action, the secondary fire control system is still available. The secondary fire control system, as pointed out above, utilizes the persicopes 580, 583 mounted in the turret 526 of the armored vehicle. The upper periscope 583 is to be used by the vehicle commander and the other periscope 580 by the gunner. A ballistic drive unit 581 is provided to function as the driving unit between the gun trunnions 531 and the two periscopes.

The secondary system is first conditioned as to the type of ammunition to be used. This is done by the commander by positioning the movable frame 601 of the ballistic drive unit for the proper selection. A target is then selected by the commander and the range is estimated and set in by operating the range knob 602 of the ballistic drive unit to index that range on the scale for the ammunition selected. This adjustment corrects the periscopes for the proper superelevation by positioning the lines of sight of the periscope relative to the armament. It is then necessary to manipulate the gun elevation and azimuth controls, either with the aid of the power driven or the manual mechanisms above mentioned, to position the target directly above the vertical sighting reticle as seen in the periscopes. The armament is then ready for firing at the target except for introducing the proper lead.

Thus, it will be recognized by those persons skilled in the art that the present fire control system facilitates the firing of armament at a target and enables a more precise and suitable arrangement particularly for use in armored vehicles or the like. Not only is the system designed whereby all knobs, levers and cranks needed for use are disposed within easy reach of the operator but also it eliminates the need for a person to look away from the field of view as seen through the instrument to determine whether the proper ballistic correction factors have been introduced. In addition, the stationary position of the fire control eyepieces relative to the movable lines of sight and the correction for image lean as the angle of elevation of those lines of sight is changed are further advantages of the arrangements provided. Provision is also made for automatically correcting the angle of elevation of the armament by power driven mechanisms, or correcting such angle of elevation through manually operated means or by a combination thereof.

It will be recognized further that the arrangement of parts and the system is conducive to compactness thus rendering the apparatus particularly suitable to armored vehicle applications as well as to other such uses such, for example, as battleship turrets, etc. The system is such as to increase efficiency and maintain constant visual control over the ballistic factors essential in controlling the fire of armament.

Although a specific embodiment of the present invention is shown and described herein, it will be recognized by those persons skilled in the art that various changes and modifications are possible within the spirit of the invention. For example, the arrangement of parts may be altered to suit a particular application or the scales may be changed as required or the procedure of using the instrument may be varied at the will of the operator. Therefore, it is desired that the particular form of the present invention described herein be considered as illustrative and not as limiting.

We claim:

1. A binocular fire control instrument, which instrument is mountable on a gun support, is connectable to a gun pivotally movable in elevation on the support, and is operable to correct the angle of elevation of the gun to compensate for the range of a target, for the ballistic properties of the type of ammunition to be fired from the gun and for ambient ballistic factors, such instrument comprising: a main housing including optical components comprising objective ends of optical systems of a binocular, said main housing being mountable on the gun support for pivotal movement about an axis which is substantially parallel to that about which the gun is pivotally movable; a secondary housing having first and second portions and containing other optical components comprising a remainder of the optical systems of the binocular including eyepiece ends, the first portion of said secondary housing being inside said main housing and being supported thereby so that said main housing, in moving pivotally on the gun support, pivots about the first portion of said secondary housing, and the second portion of said secondary housing, including the eyepieces, extending outside said main housing and being secured to the gun support; a collimator including a left and a right stereoscopic reticle assembly and collimating lenses, said collimator being disposed in said main housing outside the optical systems of the binocular, an image of the left stereoscopic reticle being projected into a right optical system of the binocular and an image of the right stereoscopic reticle being projected into a left optical system of the binocular and being in substantial consequence with the image of the left stereoscopic reticle; an optical compensator disposed in one of the optical systems of the binocular; means for moving part of said compensator across that optical system and said compensator serving, along with the stereoscopic reticles, to enable stereoscopic contact to be established with a target; a scales-gun reticle unit having first, second and third bar members and having first and second fixed reference marks, the first bar member including a range scale and being slidable so that the range scale is movable with respect to the first reference mark, the first bar also being so correlated with said optical compensator that the first reference mark indicates the distance at which stereoscopic contact is established with the target, the second bar including a gun reticle, and the third bar including an ammunition scale comprising markings designating different types of ammunition, and the third bar being slidable so that the markings are movable with respect to the second reference mark, said scales-gun reticle unit being disposed in said main housing, the image of any portion of the range scale, of the first reference mark, of the gun reticle, of any portion of the ammunition scale, and of the second reference mark being projected into said collimator and thence into one of the optical systems of the binocular; and a ballistic mechanism in said main housing, said ballistic mechanism including a first portion operable in consequence of the movement of said optical compensator and the first bar of said scales-gun reticle unit to correct the angle of elevation of the gun to compensate for target range, said ballistic mechanism including a second portion operable in consequence of the movement of the third bar of said scales-gun reticle unit to correct the angle of elevation of the gun to compensate for the ballistic properties of the type of ammunition to be fired from the gun; and said ballistic mechanism including a third portion operable to correct the angle of elevation of the gun to compensate for ambient ballistic conditions, said ballistic mechanism also being operable to combine the operation of the first, second and third portion thereof into a resultant operation to correct the angle of elevation of the gun to compensate for the combined effects of range, of the ballistic properties of the type of ammunition to be fired and of the ambient ballistic conditions.

2. The binocular fire control instrument of claim 1 plus a pivotally movable transfer prism in the collimator, whereby the image of any portion of the range scale, of the first reference mark, of the gun reticle, of any portion of the ammunition scale, and of the second reference mark, are projected in either one of two directions through the collimator and thence into either of the optical systems of the binocular.

3. The binocular fire control instrument of claim 1 wherein the images of the stereoscopic reticles, of the range scale, of the first reference mark, of the gun reticle, of the ammunition scale, and of the second reference mark, are projected into the optical system of the binocular at a point near the objective ends of the binoculars.

4. The fire control instrument of claim 1 having means, operatively connected with the stereoscopic reticle assemblies, for positioning those assemblies so that, when the stereoscopic reticles thereof are illuminated, the images of the stereoscopic reticles are positionable with respect to the image of the gun reticle.

5. The instrument of claim 1 plus means disposed between the main and the secondary housings, for correcting artificial lean of images appearing at the eyepiece of the binocular, said lean correcting means being actuated in consequence of the pivotal movement of the main housing with respect to the secondary housing.

6. The combination, with the fire control instrument of claim 1, of: a support; bearing means on the main housing, said bearing means being attached to said support and providing for pivotal movement of the main housing with respect to said support; armament carried by said support, said armament being pivotally movable about an axis which is substantially parallel to the axis of said bearing means; linkage means between the fire control instrument and said armament; and means, connected to said armament, for pivotally moving the armament in elevation.

7. In a fire control system for a gun, which gun is mounted on a support and is pivotally movable in elevation, the combination of: a binocular fire control instrument including means for stereoscopically determining range of a target, the instrument also including means operatively correlated with the range determining means and providing for correcting the angle of elevation of the gun to compensate for the range, and, further, including means for correcting the angle of elevation of the gun to compensate for a plurality of other factors when such factors are introduced into the correcting means, said binocular fire control instrument being mounted on the gun support for pivotal movement about an axis substantially parallel to that about which the gun is movable, objective ends of said binocular fire control instrument being pivotally movable in elevation; secondary fire control apparatus including at least one periscopic instrument having a pivotally movable reflector in an objective end and including means providing for correcting the angle of elevation of the gun to compensate for a plurality of factors when such factors are introduced into that just-named correcting means, said secondary fire control apparatus being mounted on the gun support and being substantially parallel to said primary fire control apparatus, the reflector in the objective end of said secondary apparatus being pivotally movable about an axis substantially parallel to the axis about which said binocular fire control instrument is pivotally movable; a first mechanical linkage means connecting the gun and said binocular fire control instrument, said linkage means operating to move said binocular fire control instrument pivotally in the gun support as the gun is pivotally moved, and said linkage operating to effect pivotal movement of said binocular fire control instrument in the gun support as range of the target is determined and as the plurality of other factors are introduced into said binocular fire control instrument; and a second mechanical linkage means connecting said binocular fire control instrument and said secondary fire control apparatus, said second linkage means serving to move pivotally the reflector in said secondary fire control apparatus as the gun and said fire control instrument are pivotally moved in the support and said second linkage means serving to effect pivotal movement of the reflector as the plurality of other factors are introduced into said secondary fire control apparatus.

8. In a fire control instrument including a binocular having a pair of illuminable stereoscopic reticles, each contained in a stereoscopic reticle assembly disposed outside the optical path of the binocular, and also having an illuminable gun reticle contained in a gun reticle bar disposed outside the optical paths of the binocular, the images of the stereoscopic reticles being projected into the optical paths of the binocular when the stereoscopic reticles are illuminated, the image of the gun reticle being projected into one optical path of the binocular when the gun reticle is illuminated, and the images of the stereoscopic and gun reticles being projected simultaneously into the optical paths of the binocular when those reticles are illuminated, the combination of: means for illuminating the stereoscopic reticles; means for illuminating the gun reticle; and switch means connected to said stereoscopic and gun reticle illuminating means, said switch means being effective to operate said stereoscopic reticle illuminating means at one time, being effective to operate said gun reticle illuminating means at another time, and being effective to operate said stereoscopic and said gun reticle illuminating means simultaneously at still another time.

9. The combination, with a gun mounted for pivotal movement in elevation on a support and with a power-driven mechanism connected with the gun and operable to move the gun pivotally in elevation, of: a binocular fire control instrument mounted on the support for pivotal movement in elevation about an axis substantially parallel to the axis about which the gun is pivotally movable; linkage means between the gun and said fire control instrument; means, in said instrument, for stereoscopically determining range of a target; and transmitter means in said instrument, said transmitter means being connected to the power-driven mechanism, being actuated by operation of said range determining means, and being operable to control operation of the power-driven mechanism to move the gun pivotally in elevation to compensate for target range.

10. In a fire control system for correcting the angle of elevation of a gun to compensate for a plurality of factors affecting that angle, the gun being supported for pivotal movement in elevation on a mount the position of which mount is adjustable azimuthally, the combination of primary means carried by the mount, said primary means comprising a binocular instrument for sighting on a target and including means for introducing into the system corrections applicable to the angle of elevation of the gun to compensate for said plurality of factors affecting that angle, a part of the binocular including objective ends thereof being pivotally movable in elevation, secondary means carried by the mount, said secondary means comprising at least one periscopic instrument for sighting on a target and including other means for introducing into the system corrections applicable to the angle of elevation of the gun to compensate for said plurality of factors affecting that angle, means connected to the gun and being operable to move the gun pivotally in elevation, and linkage means connecting the gun with said primary and said secondary means for controlling relative movement therebetween, said linkage means serving to move pivotally in elevation the parts of the binocular and periscopic instruments including the objective ends thereof in consequence of pivotal movement of the gun in elevation, and said linkage means serving to move pivotally in elevation the parts of the binocular and periscopic instruments including the objective ends thereof in consequence of operating said primary and secondary means to introduce into the system corrections applicable to the angle of elevation of the gun to compensate for the factors affecting that angle.

11. The combination of claim 10 wherein the binocular instrument includes additionally optical means for stereoscopically determining the range of a target, said optical means being operatively integrated with the means in the primary means for introducing corrections and thereby providing for correcting the angle of elevation of the gun to compensate for target range.

12. The combination of claim 10 wherein said primary means includes collimating means for correlating left and right optical systems of the binocular, said correlating means being disposed outside the binocular instrument, but being coupled optically with the binocular.

13. The combination of claim 12 wherein the collimating means has coaxial left and right optical portions and includes a stereoscopic reticle in the left portion and another stereoscopic reticle in the right portion, the image of a stereoscopic reticle in the left portion of the collimator means being projected into the right optical path of the binocular, and the image of the stereoscopic reticle in the right of the collimator means being projected into the left optical path of the binocular and being in substantial congruence with the image of the other stereoscopic reticle in the field of view of the binocular.

14. In combination with a gun support having at least one gun mounted for pivotal movement thereon for adjustment of the angle of elevation of the gun, the gun support being positionable in azimuth, primary means for directing the fire of the gun in elevation, said primary means being mounted on the gun support, said primary means comprising a binocular instrument having one portion thereof including eyepieces stationary relative to the gun support and having a second portion thereof including objective ends pivotally movable in elevation relative to the gun support, the axis of the pivotal movement of the second portion being parallel to the axis of the pivotal movement of the gun in elevation, said primary means including superelevation means into which are introduced corrections for adjusting the angle of elevation of the gun to compensate for a plurality of factors affecting that angle, secondary means being mounted on the gun support, said secondary means comprising at least one periscopic instrument having one portion thereof including an eyepiece stationary relative to the gun support and having a second portion thereof including an objective end pivotally movable in elevation, the axis of pivotal movement of the second portion being substantially parallel to the axis of pivotal movement of the gun in elevation, said secondary means including superelevation means into which are introduced corrections for adjusting the angle of elevation of the gun to compensate for a plurality of factors affecting that angle, linkage means connecting the optical instruments in said primary and said secondary means with the gun, said linkage means being attached to the second portions of the optical instruments and serving to move pivotally those second portions in elevation correspondingly with the gun as the angle of elevation of the gun is changed, said linkage means including means operable to move pivotally in elevation, the second portion of the binocular instrument in the primary means relative to said gun and relative to said secondary means as corrections for adjusting the angle of elevation of the gun are introduced into the superelevation correcting means in said primary means, and said linkage means further including means operable to move pivotally in elevation the second portion of the periscopic instrument in said secondary means relative to the gun and relative to said primary means as corrections for superelevation are introduced into the superelevation correcting means in said secondary means.

15. In a fire control system for a gun, which gun is mounted on a support for pivotal movement in elevation and depression, the combination of a binocular sighting system for viewing a target area, said binocular sighting system including an optical compensator movable across an optical path of said sighting system and serving to aid in establishing stereoscopic contact with a target, said sighting system being mounted on the support and being pivotally movable in elevation, the lines of sight of said sighting system being coordinated with each other and with the line of fire of the gun, a collimator system comprising right and left groups of optical elements disposed to provide coaxial optical paths through the collimator, the right and left groups each including a stereoscopic reticle usable with the compensator to establish stereoscopic contact with a target, said collimator system being disposed outside the optical paths of the binocular sighting system and being optically coupled to said binocular sighting system, the image of the left stereoscopic reticle being projectable into the right optical path of said binocular sighting system and the image of the right stereoscopic reticle being projectable into the left optical path of said binocular sighting system, a scales-gun reticle unit including a range scale slidable with respect to a range reference mark, a gun reticle, and including an ammunition scale slidable with respect to an ammunition reference mark, the range scale being mechanically correlated with the optical compensator and with the stereoscopic reticles and indicating the distance from the fire control system at which stereoscopic contact with the target is established, the image of the range scale, of the range reference mark, of the gun reticle, of the ammunition scale and of the ammunition reference mark being projectable into said collimator system and thence into one optical path of said binocular sighting system for viewing by an observer, and a ballistic mechanism mechanically correlated with the optical compensator and with the range and ammunition scales, said ballistic mechanism being operable to introduce into the fire control system corrections applicable to the angle of elevation of the gun to compensate for target range and for ballistic properties of the type of ammunition to be fired against the target.

References Cited in the file of this patent

UNITED STATES PATENTS

| | | |
|---|---|---|
| 1,937,336 | Ford et al. | Nov. 28, 1933 |
| 2,401,693 | Luboshez | June 4, 1946 |
| 2,422,710 | Zaroodny | June 24, 1947 |
| 2,453,697 | Brown | Nov. 16, 1948 |
| 2,466,725 | Minter | Apr. 12, 1949 |
| 2,549,030 | Stewart | Apr. 17, 1951 |
| 2,693,031 | Clark | Nov. 2, 1954 |
| 2,707,331 | Christensen | May 3, 1955 |